(12) United States Patent
Kagan

(10) Patent No.: US 7,034,263 B2
(45) Date of Patent: *Apr. 25, 2006

(54) APPARATUS AND METHOD FOR INDUCTIVE HEATING

(75) Inventor: Val Kagan, Colchester, VT (US)

(73) Assignee: iTherm Technologies, LP, Merrimack, NH (US)

( * ) Notice: Subject to any disclaimer, the term of this patent is extended or adjusted under 35 U.S.C. 154(b) by 21 days.

This patent is subject to a terminal disclaimer.

(21) Appl. No.: 10/612,272

(22) Filed: Jul. 2, 2003

(65) Prior Publication Data

US 2005/0000959 A1   Jan. 6, 2005

(51) Int. Cl.
*H05B 6/04* (2006.01)

(52) U.S. Cl. .................... 219/661; 219/601; 219/628; 219/660

(58) Field of Classification Search ............. 219/601, 219/628–630, 656, 635, 660–670, 672–675; 363/39–41; 323/265–290

See application file for complete search history.

(56) References Cited

U.S. PATENT DOCUMENTS

| | | | |
|---|---|---|---|
| 1,771,918 A | 7/1930 | Fry | |
| 2,163,993 A | 6/1939 | Dufour | |
| 3,436,641 A * | 4/1969 | Biringer | 363/10 |
| 3,436,642 A | 4/1969 | Segsworth | |
| 3,440,384 A | 4/1969 | Schroeder | 219/10.49 |
| 3,639,782 A | 2/1972 | Lord | 307/252 T |
| 3,708,645 A | 1/1973 | Osborn | 219/10.41 |
| 4,017,701 A | 4/1977 | Mittelmann | 219/10.49 |
| 4,025,864 A | 5/1977 | Kennedy | 321/68 |
| 4,085,300 A * | 4/1978 | MacKenzie et al. | 219/625 |
| 4,151,387 A | 4/1979 | Peters, Jr. | 219/10.49 R |
| 4,211,912 A | 7/1980 | Kiuchi | 219/10.77 |

(Continued)

FOREIGN PATENT DOCUMENTS

GB    752268    7/1956

(Continued)

OTHER PUBLICATIONS

Stanley Zinn and S.L. Semiatin: "Coil design and fabrication: basic design and modifications," (pp. 32-36), Heat Treating, Jun. 1988.

(Continued)

*Primary Examiner*—Philip H. Leung
(74) *Attorney, Agent, or Firm*—Kudirka & Jobse, LLP

(57) ABSTRACT

A system and method for inductive heating, in which a power source provides current pulses with high-frequency harmonics to a heater coil, the coil generating a magnetic flux for inductive heating of an article. The high-frequency harmonics enhance a relative proportion of inductive heating, compared to resistive heating of the heater coil. Providing these high-frequency harmonics, occurring above the border frequency of the heating system, enables the system to deliver an increased proportion of inductive heating, compared to resistive heating, without requiring an increase in the Root Means Square (RMS) current in the coil. Providing better coupling between the coil and the core, such as by embedding the coil wholly or at least partially in the core, and providing a magnetic yoke to close the loop with the core, can provide a significantly decreased border frequency. This reduction of the border frequency then can be utilized to provide larger amounts of energy in the high-frequency harmonics of the current pulses, and thus provide a greater percentage of inductive heating without increasing the current in the coil. The current pulses preferably have steeply varying portions, such as a steeply varying leading edge and/or trailing edge.

16 Claims, 19 Drawing Sheets

U.S. PATENT DOCUMENTS

| | | | | |
|---|---|---|---|---|
| 4,277,667 A | 7/1981 | Kiuchi | | 219/10.49 R |
| 4,289,946 A * | 9/1981 | Yarwood et al. | | 219/665 |
| 4,290,039 A | 9/1981 | Tochizawa | | 335/262 |
| 4,355,222 A | 10/1982 | Geithman | | 219/10.57 |
| 4,473,732 A | 9/1984 | Payne | | 219/10.77 |
| 4,589,059 A | 5/1986 | Tanino | | 363/49 |
| 4,733,342 A | 3/1988 | Mueller | | 363/132 |
| 4,798,926 A | 1/1989 | Sakai | | 219/10.43 |
| 4,814,567 A | 3/1989 | DeAngelis | | 219/10.51 |
| 5,053,593 A | 10/1991 | Iguchi | | 219/10.493 |
| 5,183,985 A | 2/1993 | Sidky et al. | | |
| 5,216,215 A | 6/1993 | Walker | | 219/10.51 |
| 5,294,769 A * | 3/1994 | Nishi et al. | | 219/601 |
| 5,331,127 A | 7/1994 | Chen | | 219/661 |
| 5,343,023 A | 8/1994 | Geissler | | 219/661 |
| 5,414,247 A | 5/1995 | Geithman | | 219/667 |
| 5,444,229 A | 8/1995 | Rudolph | | 219/630 |
| 5,789,721 A | 8/1998 | Hayashi | | 219/664 |
| 5,847,370 A | 12/1998 | Sluka et al. | | |
| 5,854,473 A | 12/1998 | Malnoe | | |
| 6,043,635 A | 3/2000 | Downey | | 323/282 |
| 6,393,044 B1 | 5/2002 | Fishman | | 373/138 |
| 6,405,785 B1 | 6/2002 | Gellert | | 164/312 |
| 6,465,990 B1 | 10/2002 | Acatrinei | | 323/222 |
| 6,717,118 B1 | 4/2004 | Pilavdzic | | 219/601 |
| 6,781,100 B1 | 8/2004 | Pilavdzic | | 219/601 |
| 2003/0121908 A1 * | 7/2003 | Pilavdzic et al. | | 219/630 |

FOREIGN PATENT DOCUMENTS

| | | |
|---|---|---|
| GB | 772424 | 4/1957 |
| JP | 02117088 A | 5/1990 |
| JP | 02117089 A | 5/1990 |
| JP | P2003-136559 A | 5/2003 |
| WO | 03/001850 A1 | 1/2003 |

OTHER PUBLICATIONS

Stanley Zinn and S.L. Semlatin: "Coil design and fabrication: part 2, specialty coils", (pp. 29-41), Heat Treating, Aug. 1988.

Stanley Zinn and S.L. Semiatin: "Coil design and fabrication: part 3, fabrication principles," (pp. 39-41), Heat Treating, Oct. 1988.

Copy of Invitation to Pay Additional Fees and International Search Report mailed Dec. 13, 2004 in related application PCT/US2004/021533.

Induction Calender Profiler System Control Card Programmers' Manual, PCB version 1.0, Comaintel Inc., 2001.

Induction Calender Profiler System Operator's Manual, Comaintel Inc. 2001.

* cited by examiner

APPARATUS AND METHOD FOR INDUCTIVE HEATING

BACKGROUND OF THE INVENTION

This invention relates to systems and methods for inductive heating, and more specifically to power supplies for enhanced efficiency in such heating systems and methods.

It is common practice to inductively heat a cylinder or tube of a magnetisable material, such as steel, by an induction (eddy) current. This eddy current is induced in the material by an applied magnetic flux, the magnetic flux being generated by passage of an alternating current through one or more heater coils typically disposed around the cylinder or tube. This method of inductive heating can be adapted to various other types of work pieces or loads, including: fluids; filled or semisolid or solid materials (e.g., molten steel or magnesium filled and non-filled polymers, billets, ceramics); and substrates (e.g., where heat inductively generated in the substrate is transferred to another article, such as a semiconductor wafer).

In the various known systems, the article to be heated may itself be heated by an induction current, or the article to be heated may be in thermal communication, e.g., by conduction or radiation, with another article being inductively heated. Still further, the heater coil (to which the alternating current is applied, causing the coil to generate the alternating magnetic field) may be made of a more highly resistive material thereby increasing the amount of resistive heat generated in the coil; this resistive heat may likewise be transferred to the article to be heated. For example, Nichrome is a nickel chromimum (NiCr) alloy that has roughly sixty times the electrical resistivity of copper. Thus, a Nichrome heater coil can generate both an alternating magnetic field to cause inductive heating in an article lying within the field, as well as resistive heat in the coil which is then transferred by conduction and/or radiation to the same article.

Various systems have been proposed which utilize different combinations of such heating techniques. There is a need for energy sources to power such systems more efficiently and preferably at a lower cost than in the past.

SUMMARY OF THE INVENTION

Systems and methods consistent with the present invention include the following implementations.

An apparatus according to one implementation includes an article to be inductively heated and a heater coil, where a current pulse signal with high-frequency harmonics is supplied to the heater coil. The heater coil, which is at least partially embedded in the article, generates a magnetic flux based on the current pulse signal and is inductively coupled to the article, the article forming at least a portion of a closed loop for the magnetic flux.

In another implementation, the apparatus is a power source providing current pulses with high-frequency harmonics to a heater coil, the coil generating a magnetic flux for inductive heating of an article. The high-frequency harmonics enhance a relative proportion of inductive heating, compared to resistive heating, of the heater coil. The power source may include a lower line frequency current source. The heater coil may include a resistive conductor for generating resistive heat, wherein the resistive conductor is in thermal communication with the article.

The heater coil may be inductively coupled to a load which includes the article. The load may include a core and a yoke, with the heater coil disposed between or embedded within at least one of the core and yoke. The core may have a passageway for a flowable material, wherein the core heats the flowable material. The heater coil may be positioned in the core so that heating is concentrated in the passageway.

In one implementation, an article which forms at least a part of a closed loop for the magnetic flux, has a first portion in which inductive heating is more concentrated compared to a second portion of the article. The second portion creates discontinuities or restrictions to the flow of eddy currents, such as by slots or air gaps in the second portion.

According to another implementation, available power sources are provided which supply current pulses with an adjustable energy content to a heater coil, so as to adjust a ratio between inductive and resistive heating produced by the coil.

In another implementation, an apparatus includes a heater coil inductively coupled to an article, the article having a passageway for a flowable material to be heated, the coil being positioned in the article to deliver heat generated inductively in the article to the flowable material in the passageway, and a source of adjustable nonsinusoidal current pulses coupled to the heater coil for adjusting the delivery of inductive heating to the flowable material in the passageway.

A method implementation includes steps of providing a heater coil in thermal communication with and inductively coupled to an article, and providing an adjustable nonsinusoidal current pulse signal to the heater coil for adjusting the ratio between inductive and resistive heating of the article.

According to another method implementation, the steps include providing a heater coil inductively coupled to an article, and providing a nonsinusoidal current pulse signal to the heater coil with the pulse having a rate of change which produces high frequency harmonics.

BRIEF DESCRIPTION OF THE FIGURES

FIG. 4a is a timing diagram showing the generation of current pulses from a low-frequency line current by the thyristors of FIG. 3a;

DETAILED DESCRIPTION

Figure 1A:
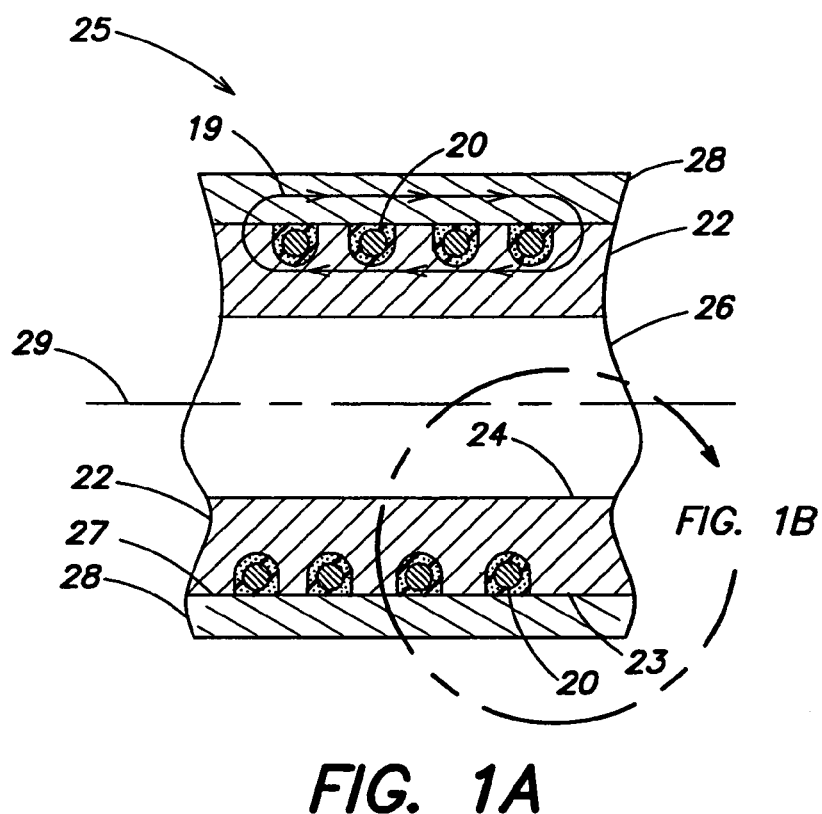
FIG. 1a is a cross-sectional schematic diagram of one implementation of a heating system for providing both inductive and resistive heating, wherein a heating coil is embedded between a ferromagnetic core and a ferromagnetic yoke producing a closed magnetic loop and enhanced magnetic coupling between the coil and core/yoke.

According to one implementation of the present invention, it has been determined that providing current pulses of a certain profile to an inductive heating system increases the proportion of inductive heating (compared to resistive heating) without requiring an increase of current in the heater coil. More specifically, current pulses having a rapidly changing current profile enhance the inductive heating performance. These pulses include high-frequency harmonics, occurring above the border frequency of the heating system. The provision of such pulses to a heater coil significantly increases the power inductively provided to a ferromagnetic core or other inductively heated load, without requiring an increase of the Root Mean Square (RMS) current in the coil.

One feature of this approach can be the provision of a simpler and less costly power supply, compared to the high-frequency sinusoidal resonance power supply converters used with prior art inductive heating systems. More specifically, when a small air gap is present in the prior art systems, for example, between the heater coil and the object being heated, this air gap constitutes a high equivalent magnetic resistance to flux and produces a high border frequency. The border frequency is the frequency above which the eddy current is 180° out of phase with the current in the coil. In other words, the border frequency is the frequency above which the inductively heated core behaves equivalent to a purely resistive load relative to a power supply source. To resolve this problem, the prior art systems utilized a very high frequency and a high current signal in a resonance circuit, which were believed to be necessary to overcome the effects of the air gap and enable rapid inductive heating of the core.

In contrast, it has been determined that by providing better coupling between the coil and the core, such as for example by embedding the coil wholly or at least partially in the core, and by preferentially providing a closed loop for the magnetic flux, such as for example providing a magnetic yoke to close the loop with the core, the border frequency of the system can be significantly decreased. This reduction of the border frequency can then be advantageously utilized to provide larger amounts of energy in the current pulses above the border frequency of the system, and thus provide a greater percentage of inductive heating without increasing the current in the coil. The desired current pulses preferably have steeply varying portions, such as a steeply varying leading edge and/or trailing edge. These high slope regions provide a significant amount of energy in the pulse in the form of high-frequency harmonics, which may be far above the border frequency of the system.

The desired current pulses can be provided with a lower cost power supply, utilizing a pulse generator supplied with a low or line frequency signal. Line frequency is defined as the Hertz (Hz) level in power sources typically utilized or available for personal, commercial or industrial users, e.g. 50 or 60 Hz. Various signal generating devices including thyristors, gate-turn-off (GTO) thyristors, silicon controlled rectifiers (SCR), and integrated gate bipolar transistor (IGBT) devices, can be used to provide the short current pulses from a line frequency or direct current (DC). The pulsed, nonsinusoidal current signal, does not require a resonance circuit; in fact it is desirable not to provide a resonance circuit so that the high-frequency harmonics in the pulses are maintained. The presence of these harmonics significantly increases the power transferred inductively to the core or load.

The desired current pulses may substantially improve the performance of heating systems which utilize a combination of inductive and resistive heating, as well as for purely inductive heating systems. The current pulses are preferably used in a system with a closed magnetic loop, but will also improve performance in inductive heaters that do not have a closed magnetic loop. The lack of a closed magnetic loop may occur in a system having an air gap between the heater coil and the heated object, or any portion of the magnetic loop, or because of heating an electrically conductive, but non-magnetic core or load material.

The following equations 1 may be used to calculate the resistance to the flow of eddy currents in a material forming a cylinder (1a) or a flat plate (1b) which is part of a closed magnetic loop, for a sinusoidal current applied to a heater coil (wrapped around the cylinder or in snake shape on the flat plate) at a frequency above the border frequency, where for a cylinder:

$$R_e = \pi \frac{D}{L} \sqrt{\rho \pi \omega} \tag{1a}$$

$R_e$ is the equivalent resistance to the flow of eddy currents,
D is the diameter of the cylinder,
L is the length of the cylinder,
ρ is the resistivity of the cylinder material,
μ is the permeability of the cylinder material,
ω is the angular frequency of the eddy currents in the cylinder, and for a plate:

$$R_e = \frac{L}{p} \sqrt{\rho \mu \omega} \tag{1b}$$

$R_e$ is the equivalent resistance to the flow of eddy currents,
L is the length of the coil conductor,
p is the perimeter of the coil conductor,
ρ is the resistivity of the flat plate material,
μ is the permeability of the flat plate material,
ω is the angular frequency of the eddy currents in the plate, where ω=2πf, f is the fundamental frequency, and f=1/T for a period T.

The equivalent eddy current resistance $R_e$ increases as the square root of the frequency ω, for sinusoidal currents. It has been experimentally determined that equivalent eddy current resistance increases much faster with use of the current pulses described herein. Without limiting the scope of the invention, it may be theorized that this increased resistance is due to the effective frequency of such current pulses being higher than their nominal frequency, because the pulses include high frequency harmonics. Thus, by providing current pulses with a high rate of change of current, with respect to time, the current pulses can actually be provided at a lower fundamental frequency than the sinusoidal current which these pulses are replacing, because the steeply varying portion of these current pulses provides high frequency harmonics that more than make up for their lower fundamental frequency. As a result, more power than expected is inductively provided to a core or load when power is provided to the coil.

The desired current pulses can be generated by a variety of electronic devices which provide the required rapid switching to produce much of the pulse energy in high frequency harmonics. The use of multi-phase devices can further be used to boost the fundamental frequency of the pulses. These aspects will be described in greater detail later in the specification, with respect to a comparative experiment (see the text accompanying FIGS. 7–9).

Various implementations of an inductive heating system will now be described that may advantageously utilize these current pulses.

Figure 1B:
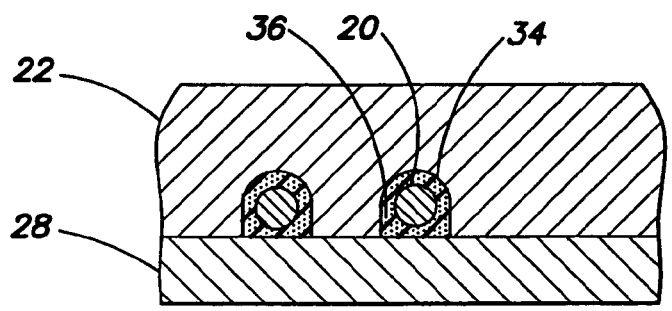
FIG. 1b is an enlarged fragmentary view of the encircled section A of FIG. 1a, showing the coil disposed in a groove in the core to provide close physical contact and enhanced inductive coupling between the heating coil and core/yoke.

FIGS. 1a–1d show two implementations of a heating system in which a heater coil is embedded in the article (ferromagnetic core and yoke) being inductively heated. FIG. 1a is a cross-sectional view of a first implementation, and FIG. 1b is an enlarged fragmentary view showing the tight physical (thermal) contact and magnetic coupling between the heater coil, core, and yoke.

More specifically, FIG. 1a shows a cross-sectional portion of an inductive heating system 25 which includes a ferromagnetic core 22 of a generally cylindrical shape (about center line 29) having a hollow central passageway 26 through which a flowable material (to be heated) may be passed. For example, core 22 may be part of a sheet extrusion die, a melt manifold/melt conveyer, or a dynamic mixer/plasticizing unit, and the flowable material may be food, plastic, or metal, etc., the later being the ultimate target for the heat from the inductive heating system. A substantially cylindrical and coaxial ferromagnetic yoke 28 surrounds the cylindrical core, with substantially direct contact between the outer diameter 23 of the core and inner diameter 27 of the yoke. The yoke 28 closes the loop (magnetic flux lines 23) so as to retain substantially all of the magnetic flux within the adjacent ferromagnetic core 22 and yoke 28, thus substantially increasing the magnetic coupling, reducing the equivalent resistance to magnetic flux, and decreasing the border frequency of the system.

A heater coil 20 is embedded within core 22. Heater coil 20 is wrapped in a helix-shaped groove 34 around the outside diameter 23 of core 22. This provides close physical contact and enables the heat resistively generated in the coil 20 to be transferred to the core 22.

Coil 20 is highly magnetically coupled to the core 22, as shown by the flux lines 23. Coil 20 can be made from a solid conductor such as copper, or from a more highly resistive material such as nickel chromium. Core 22 is fabricated of a magnetically permeable material such as iron, or other ferromagnetic material to facilitate magnetic coupling.

Coil 20 thermally communicates by close physical contact with core 22 and yoke 28 through a thermally-conductive, electrically-insulating material (e.g., layer or coating 36) surrounding coil 20. Suitable materials include magnesium oxide, and various alumina oxides, but other insulating materials can be used.

The central passageway 26 in core 22 is defined by the core's internal diameter wall 24. The substance to be heated, which can be a gas, liquid, solid or some combination thereof, is positioned in (or passes through) the passageway 26. Heat inductively generated in core 22 is transmitted to the material in passageway 26 via conduction and/or radiation.

Yoke 28 is made of a magnetically permeable material such as iron or steel, or other ferromagnetic material. Yoke 28 is located adjacent to and in thermal communication with heater coil 20. Core 22 and yoke 28 are in direct contact (substantial elimination of air gap) to provide a closed magnetic loop, as well as thermal conduction. The close coupling of coil 20 to core 22 and yoke 28, substantially reduces the border frequency of coil 20.

Figure 1C:
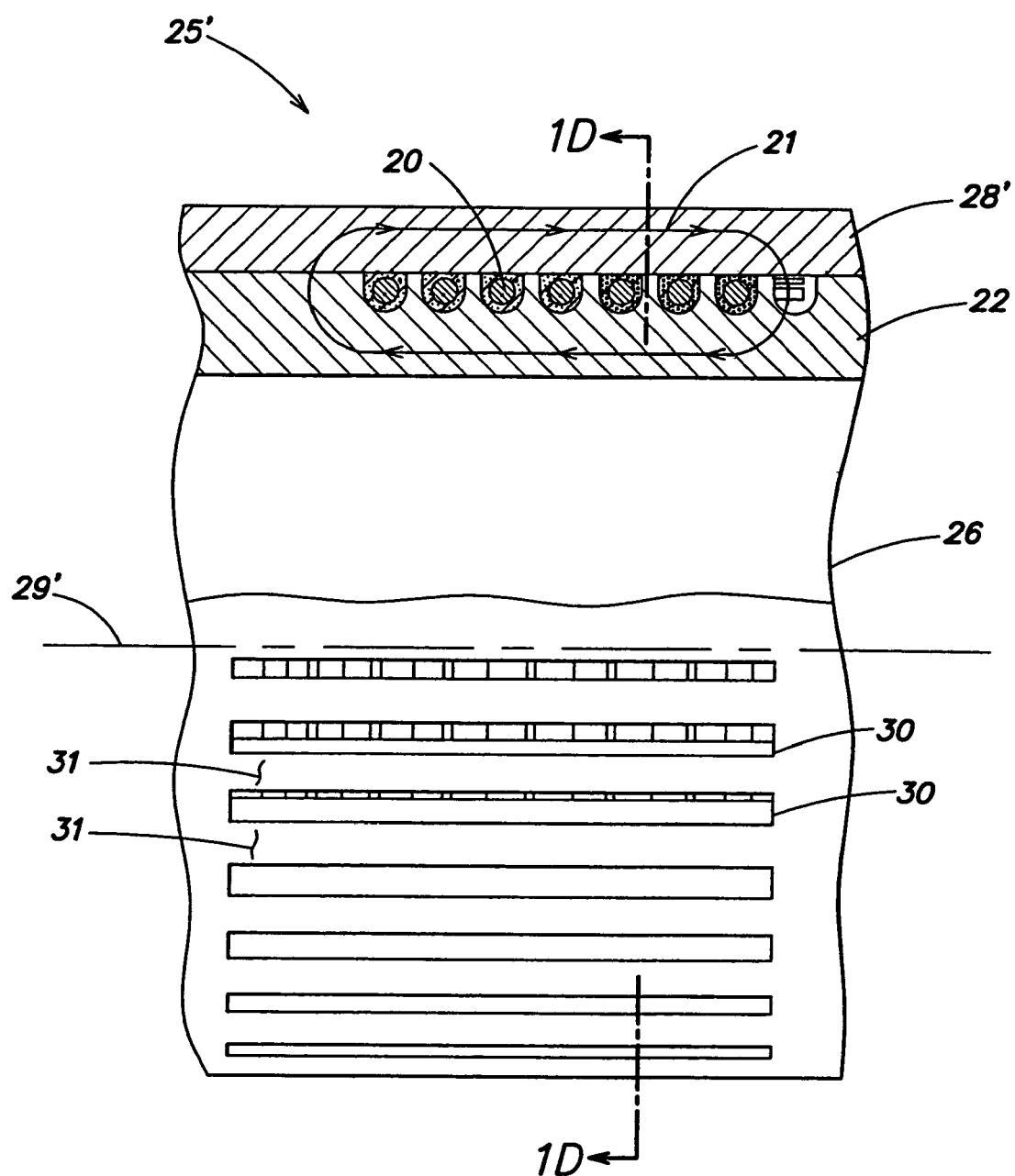
FIG. 1c is perspective view, partially in section, of a second implementation of a heating system, similar to FIG. 1a but with slots in the yoke disposed perpendicular to the coil axis.
Figure 1D:
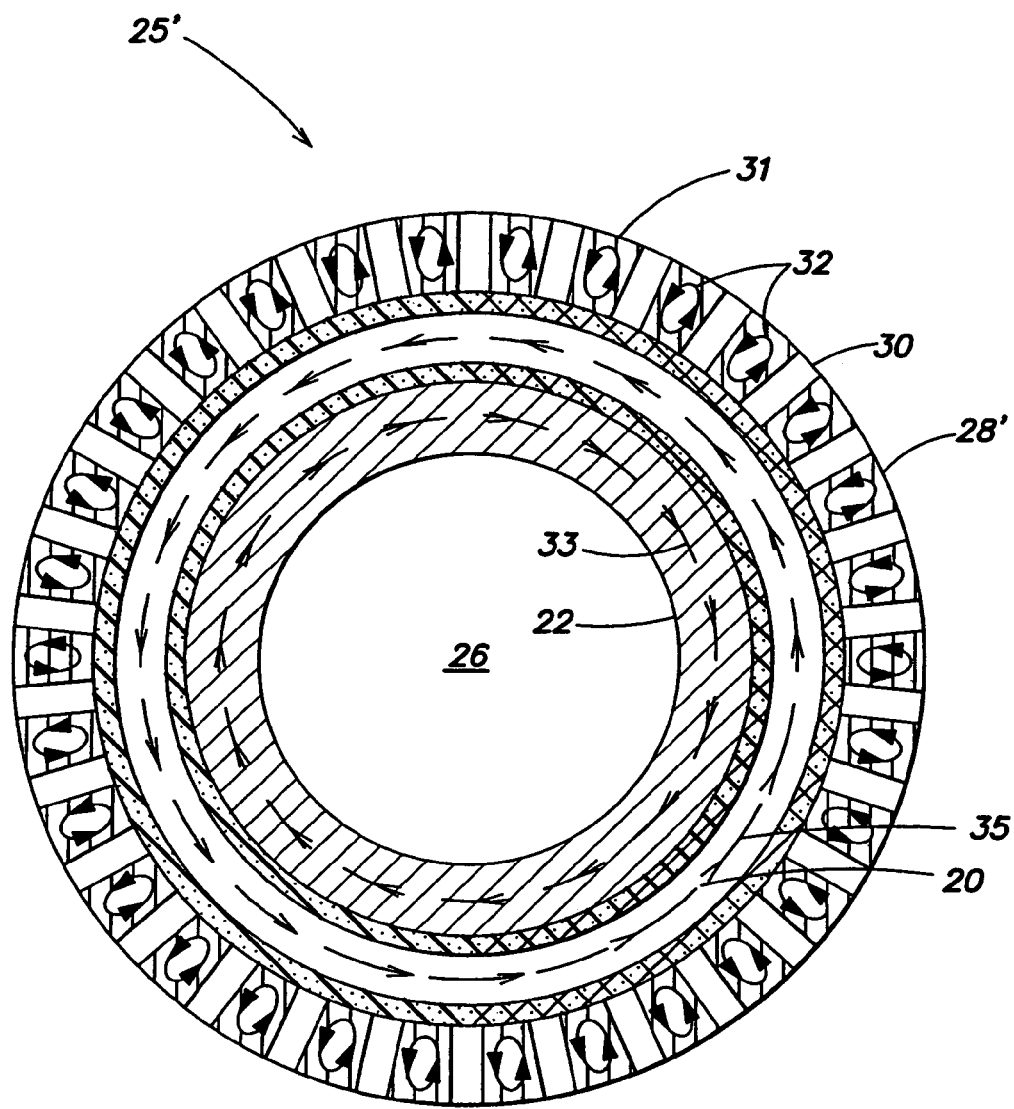
FIG. 1d is a sectional view taken along lines C—C of FIG. 1c showing induction (eddy) currents in the core directed oppositely to the current direction in the coil, and showing discontinuities in the eddy current in the yoke because of the slots.

A second implementation of a similar heating system is shown in FIGS. 1c–1d. This system 25' includes a modified yoke 28' having elongated hollow portions or slots 30 and between the slots, elongated solid portions or ribs 31; the slots and ribs are disposed substantially parallel to center line 29', at right angles to the coil axis. These slots, which are effectively air gaps, create discontinuities or restrictions in the eddy currents 32 within the yoke 28', as shown in FIG. 1d (a sectional view taken along section line C—C in FIG. 1c). In contrast, there are no slots in core 22 restricting the eddy currents 33 in core 22. This arrangement results in preferential inductive heating in the core 22, rather than the yoke 28'; this is desirable when the ultimate article to be heated is a material in the passageway 26 of core 22. Thus, a greater percentage of the power delivered to the heating system is transmitted to the article to be heated, rather than yoke 28'. In FIG. 1*d,* the current 35 in coil 20 is shown in a counterclockwise direction, and the resulting eddy current 33 in core 22 in a clockwise direction.

Figure 1E:
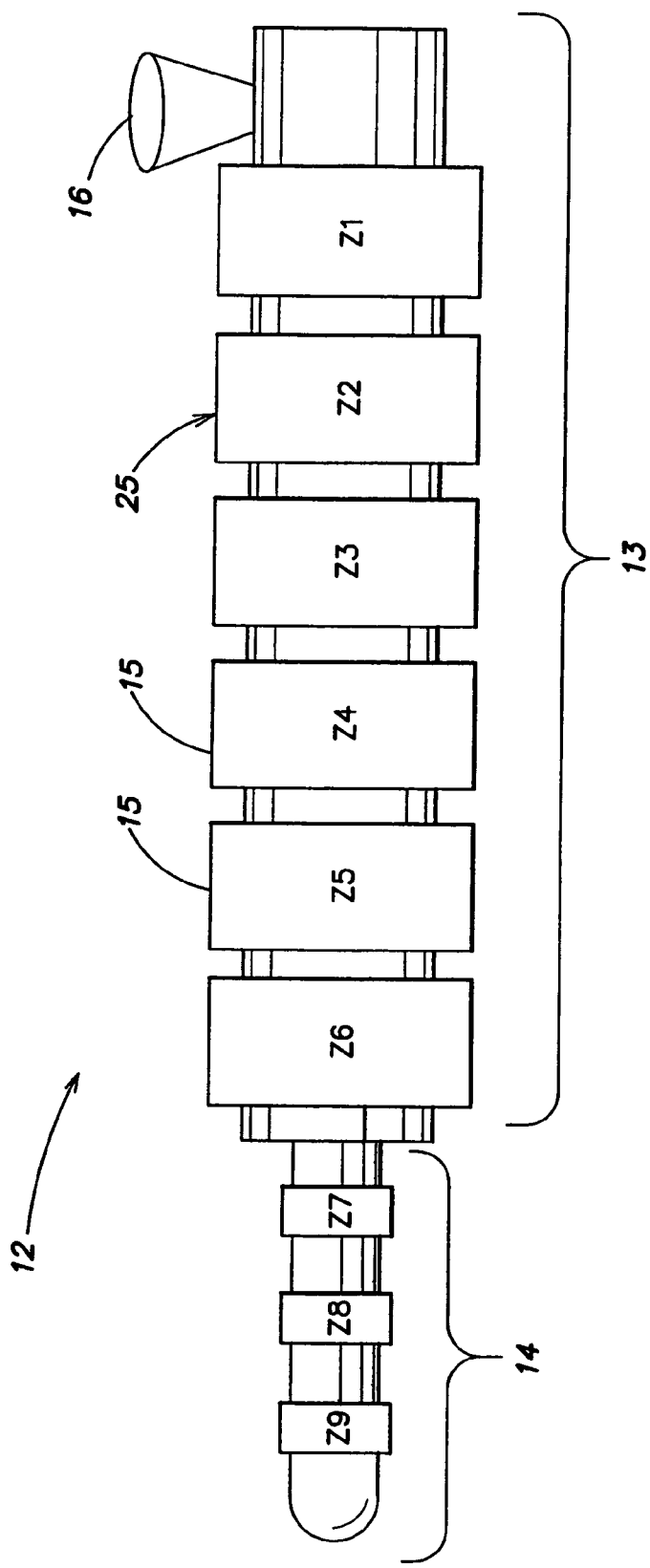
FIG. 1e is a schematic view of a barrel extruder apparatus which may utilize the heating systems of FIGS. 1a–1d.

FIG. 1*e* shows a barrel extruder 12 incorporating the inductive heating system 25 previously described. The extruder includes a barrel zone 13 with a plurality of heating zones Z1–Z6, and a nozzle zone 14 with additional heating zones Z7–Z9. A flowable material to be heated enters the barrel through an inlet funnel 16 at one end of the extruder, and proceeds through the various heating zones of the barrel and nozzle. Any one or more of the heating zones, such as zone Z2, may utilize the heating system 25 as previously described.

Figure 2:
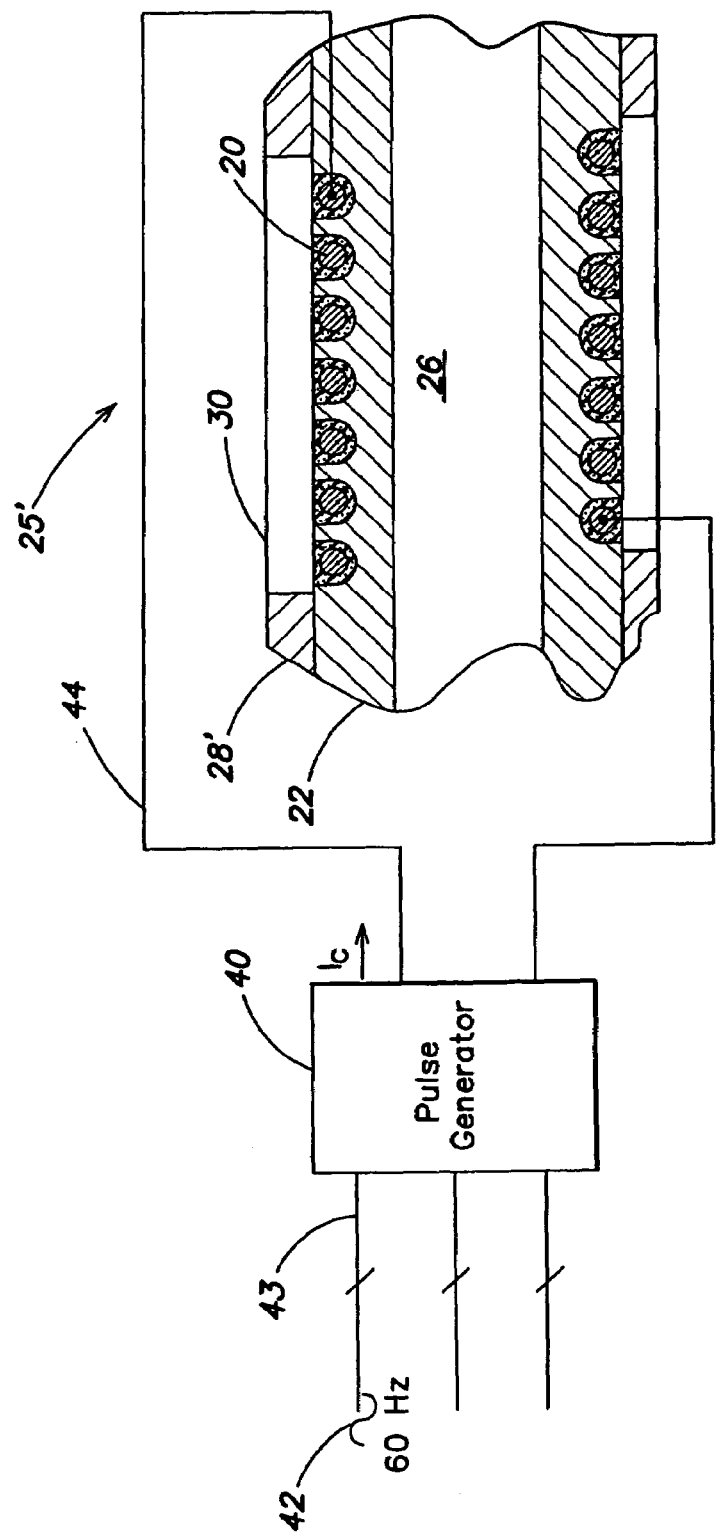
FIG. 2 is a general schematic diagram of a power supply which provides current pulses to a heating system of the type shown in FIGS. 1a–1d, according to one implementation of the invention.

FIG. 2 shows a heating apparatus, similar to that of FIGS. 1*a*–1*d,* connected to a power supply. A pulse generator 40 receives on input line(s) 43 a standard line frequency sinusoidal current signal 42 at approximately 60 Hz, and generates current pulses $I_c$ on output line 44 at that line frequency, or at a multiple of the line frequency, for delivery to coil 20. The current pulses in coil 20 generate a rapidly changing magnetic flux that is closely coupled to core 22 and which inductively heat core 22 (and ultimately the material in passageway 26). Significant eddy currents are avoided in yoke 28' because of slots 30, so yoke 28' is not substantially inductively heated. Eddy currents are favored in core 22 to significantly improve the overall inductive heating efficiency.

Figure 3A:
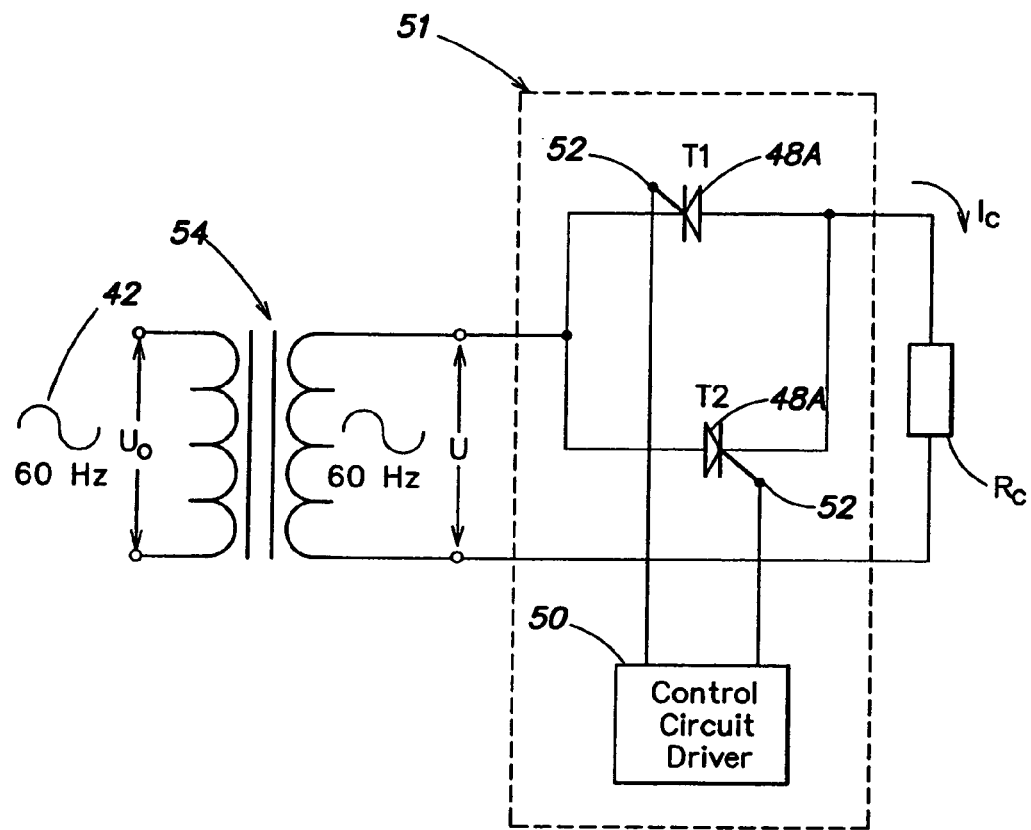
FIG. 3a is a circuit diagram of a power supply using thyristors to provide the current pulses.
Figure 3B:
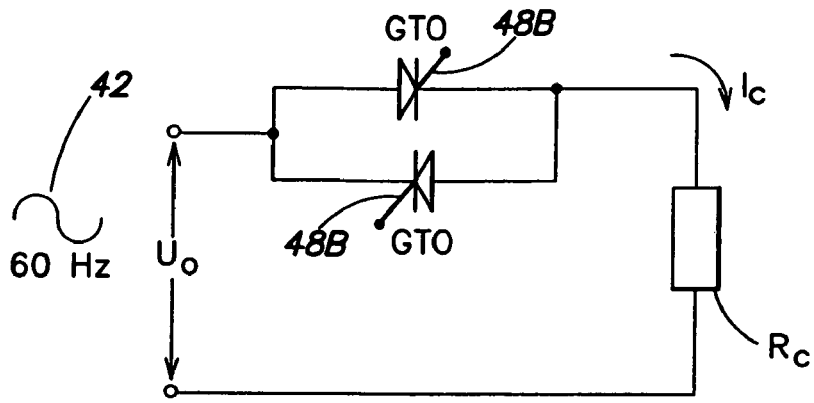
FIG. 3b is a circuit diagram of a power supply using gate-turn-off (GTO) thyristors to provide the current pulses.
Figure 3C:
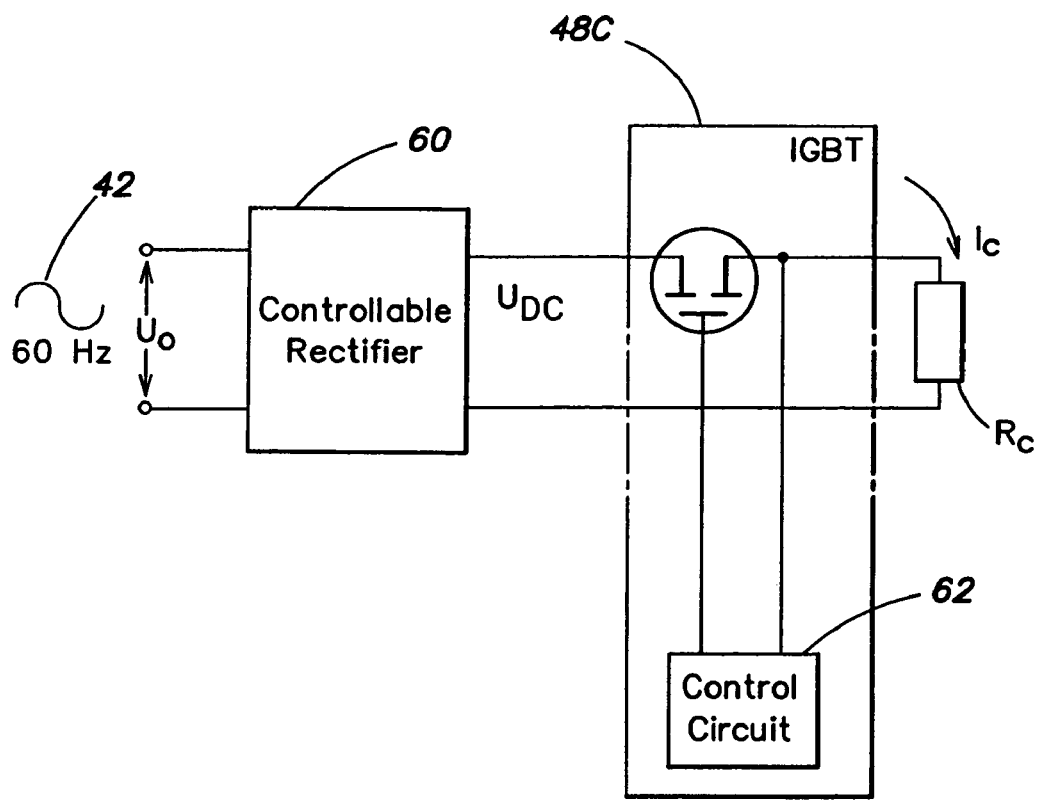
FIG. 3c is a circuit diagram of a power supply using an integrated gate bipolar transistor (IGBT) device to provide the current pulses.

Pulse generator 40 may include one or more high-speed switching devices, such as thyristors 48A, GTO thryisters 48B, or IGBT device 48C, as shown in FIGS. 3*a*–3*c,* respectively, that convert the line frequency sinusoidal current signal 42 into current pulses $I_c$ as shown in FIGS. 3*a*–3*c* and 4*a*–4*c,* respectively.

Figure 4A:
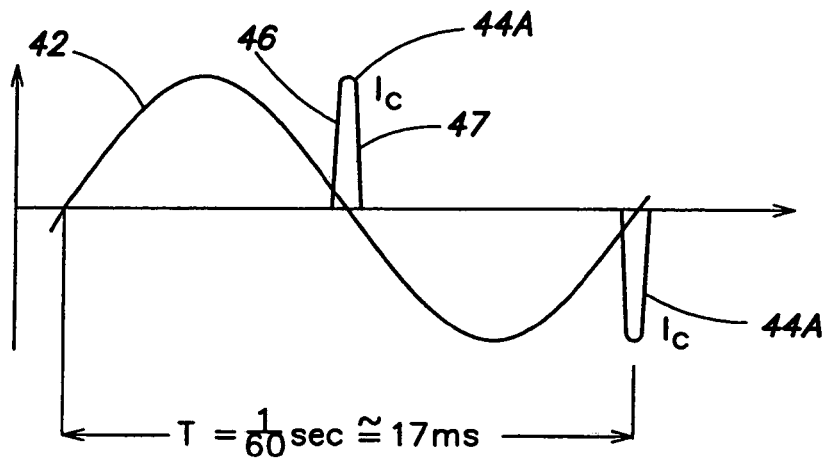

Referring to FIG. 3*a,* thyrisotors 48A are particularly useful for higher power applications, providing power in the thousands of kilowatts range. A one-phase bipolar commutator 51 (shown in a dashed box in FIG. 3*a*) includes a pair of oppositely oriented thyristors T1 and T2 in parallel arrangement and controlled by a control circuit driver 50 that provides a control signal to pins 52 to turn T1 (or T2) on when the supply line voltage is close to reversing (see FIG. 4*a*). Once turned on, the thyristor can only turn off when the applied voltage reverses, which happens a short time later as shown in FIG. 4*a*. The period of the 60 Hz line frequency is T=(1/60)seconds, which is approximately 17 milliseconds. Thus, narrow current pulses 44A are generated near 0, 180, 360 . . . degrees (as shown in FIG. 4A), at twice the line frequency. The pulse amplitude can be increased by providing a transformer 54 that boosts the voltage of the line frequency sinusoidal current signal 42 from $U_0$ to U. Thus, the RMS current provided in short pulses 44A is approximately equivalent to the RMS current directly from the line frequency sinusoidal current signal 42 having voltage $U_0$. The pulses 44A which are supplied to heater coil 20 (represented by $R_{c20}$, the equvalent total resistance of the heating coil circuit) include sharp slopes, in this case a steeply rising leading edge 46 and steeply falling trailing edge 47. A Fourier transformation of a pulse like 44A indicates that much of the energy of pulse 44A is in high frequency harmonics. Suitable thyristors T1 and T2 are available from International Rectifier Corp., El Sugendo, Calif. Integrated circuit chips with drivers 50 are also available for controlling the thyristors.

Figure 4B:
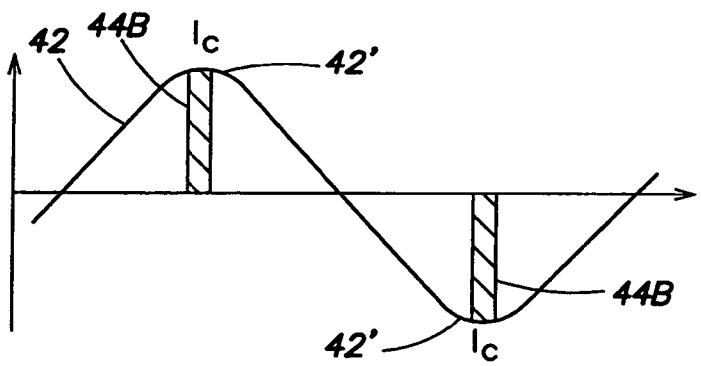
FIG. 4b is a timing diagram showing the generation of current pulses from a low-frequency line current by the GTO thyristors of FIG. 3b.

For medium power level applications, in the hundreds of kilowatts range, a pair of oppositely oriented GTO thyristors 48B can be substituted for the thyristors T1 and T2 (of FIG. 3*a*) to provide current pulses 44B at any point in the sinusoidal input signal (see FIGS. 3*b* and 4*b*). Preferably, pulses 44B are provided at the peaks 42' of the line frequency sinusoidal current signal 42, as shown in FIG. 4*b,* reducing or eliminating the need to boost the sinusoidal current signal 42 with a transformer. Suitable GTOs are available from Dynex Semiconductor, Lincoln, United Kingdom.

Figure 4C:
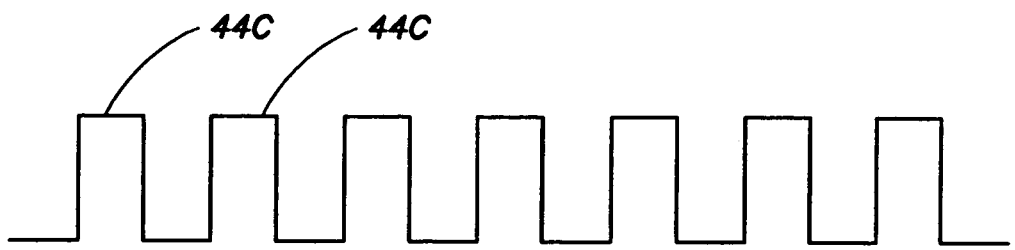
FIG. 4c is a timing diagram showing the generation of current pulses by the IGBT device of FIG. 3c.

For low and medium power level applications, an integrated gate bipolar transistor (IGBT) device 48C (see FIG. 3*c*) can be substituted for the thyristors T1 and T2 (of FIG. 3*a*) to provide pulses 44C having high frequency harmonics, such as the square wave form shown in FIG. 4*c*. A controllable rectifier 60 rectifies the line frequency sinusoidal current signal 42 to provide a DC voltage input $U_{DC}$ to IGBT device 48C. Under the direction of control circuit 62, IGBT device 48C generates current pulses from the rectified voltage so as to form square wave pulses 44C that are fed to the heater coil 20. Suitable IGBT devices are available from International Rectifier Corp., such as the IRGKI140U06 device which provides hard switching at 25 kHz with a V (voltage over extended time) of 600 volts and an $I_c$ (current over extended time) of 140 amps. Such IGBT devices were previously used to provide a high frequency signals to a resonance circuit for induction heating; however in the prior resonance systems, the advantage of high frequency harmonics in the pulses was not obtained. In contrast, here the current pulses with their high frequency harmonics retained are provided directly to coil 20, avoiding any use or requirement of a resonance circuit. The current pulses arrive at a fundamental frequency of the pulses, with the higher frequency harmonics arising from the sharply changing slope of the individual pulses.

Figure 5A:
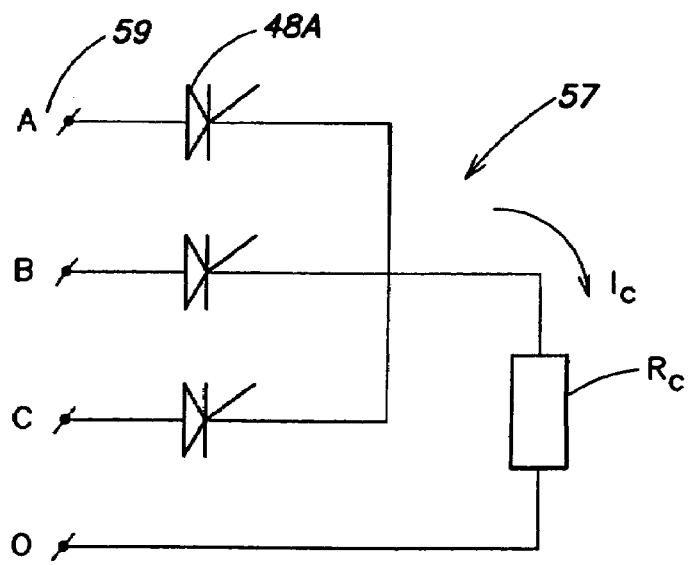
FIG. 5a is a circuit digram showing one configuration of a three-phase, three pulse unipolar commutator to provide additional current pulses from additional phases of the line frequency supply.
Figure 6A:
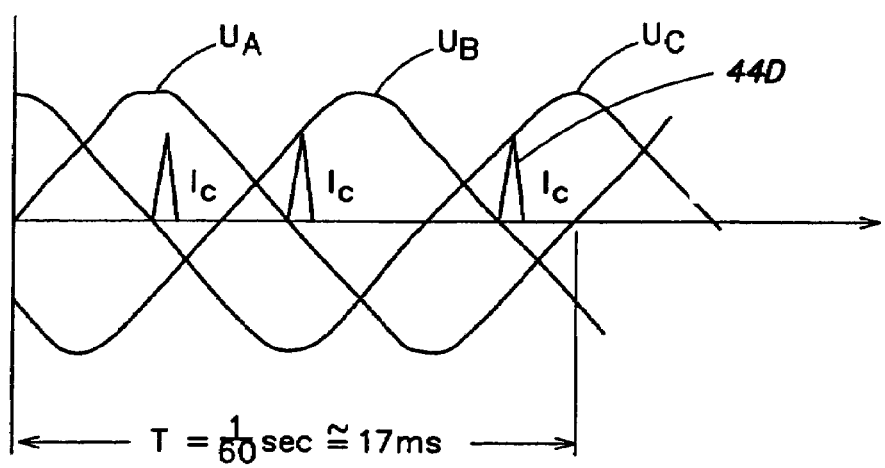
FIG. 6a is the associated timing diagram.

In each of FIGS. 3*a* and 3*b,* a parallel arrangement of two oppositely oriented switching devices provides two pulses from each period of a single-phase sinusoidal line current supply. More complex arrangements of thyristors or GTOs can be used to provide more pulses from each period of a multi-phase supply. An example of such an arrangement is a three-phase, three-pulse unipolar commutator in which a three-phase supply 59 provides three unipolar pulses to coil $R_{C20}$, as shown in the apparatus of FIG. 5*a*. The associated timing diagram is shown in FIG. 6*a,* where the three voltage signals $U_A$, $U_B$, $U_C$ produce three pulses 44D in one period (T=(1/60) sec≅17 ms).

Figure 5B:
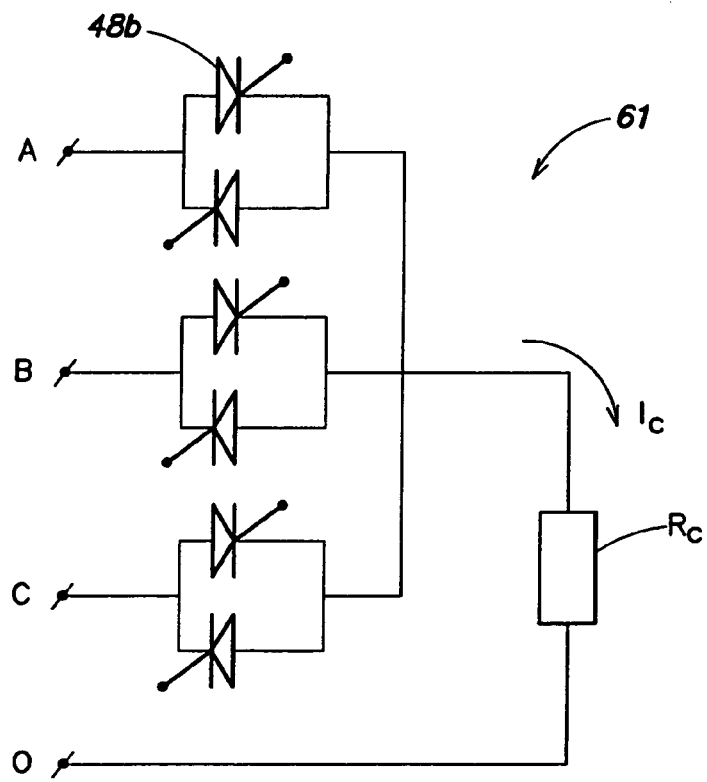
FIG. 5b is a circuit diagram showing one configuration of a three-phase, six pulse bipolar commutator for providing additional current pulses from additional phases of the line frequency supply.
Figure 6B:
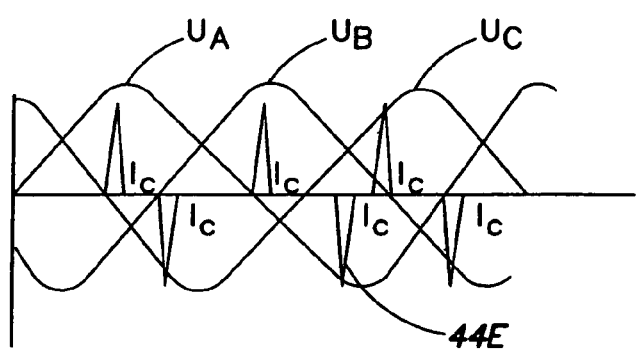
FIG. 6b is the associated timing diagram.

Alternatively, a three-phase six pulse bipolar commutator 61 is shown in the circuit of FIG. 5*b* and corresponding timing diagram of FIG. 6*b,* producing six bipolar pulses 44E in one period.

Figure 5C:
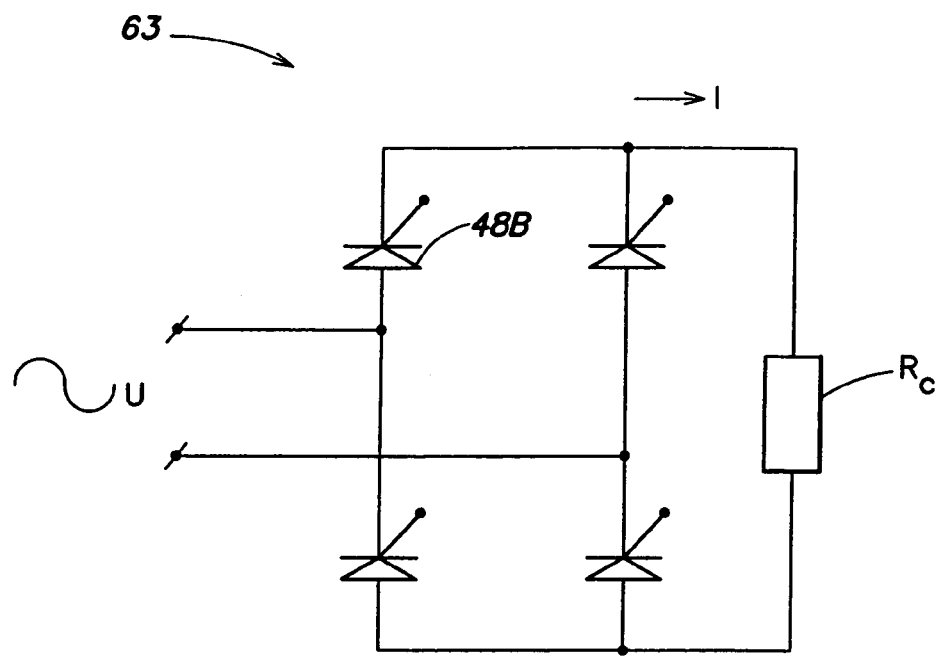
FIG. 5c is a circuit diagram showing one configuration of a one-phase, two pulse unipolar pulsator for providing additional current pulses from the bridge circuit of the line frequency supply.
Figure 6C:
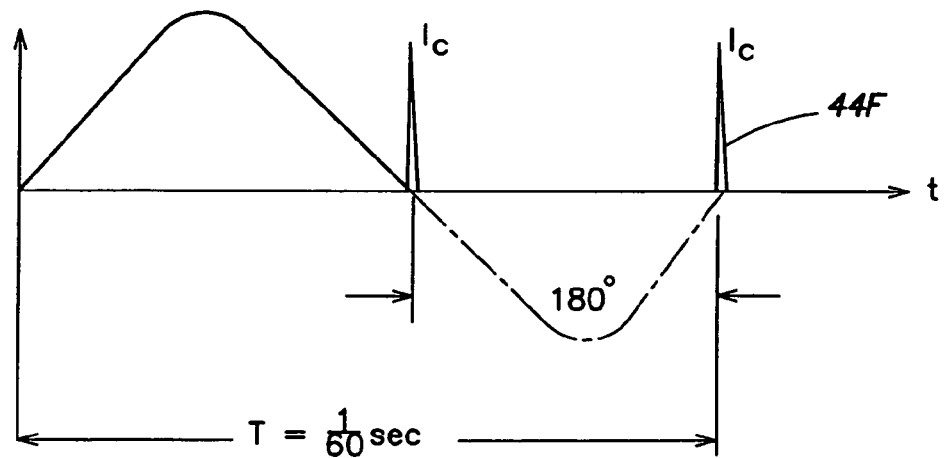
FIG. 6c is the associated timing diagram.
Figure 5D:
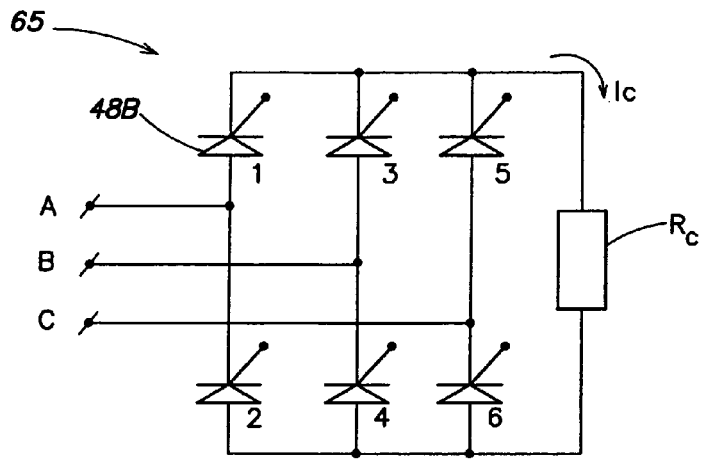
FIG. 5d is a circuit diagram showing one configuration of a three-phase, six pulse unipolar pulsator for providing additional current pulses from additional phases of the line frequency supply.

As a further alternative, a one-phase two-pulse unipolar pulsator supply 63 providing two unipolar pulses 44F, is shown in the circuit of FIG. 5*c* and the corresponding timing diagram of FIG. 6*c*. As a still further alternative, a three-phase six-pulse unipolar pulsator supply 65, providing six unipolar pulses 44G, is shown in the circuit of FIG. 5*d* and corresponding timing diagram of FIG. 6*d*. Finally, a three-phase supply 67, providing 12 unipolar pulses 44H, is shown in the circuit of FIG. 5*e* and corresponding timing diagram of FIG. 6*e*.

Figure 6D:
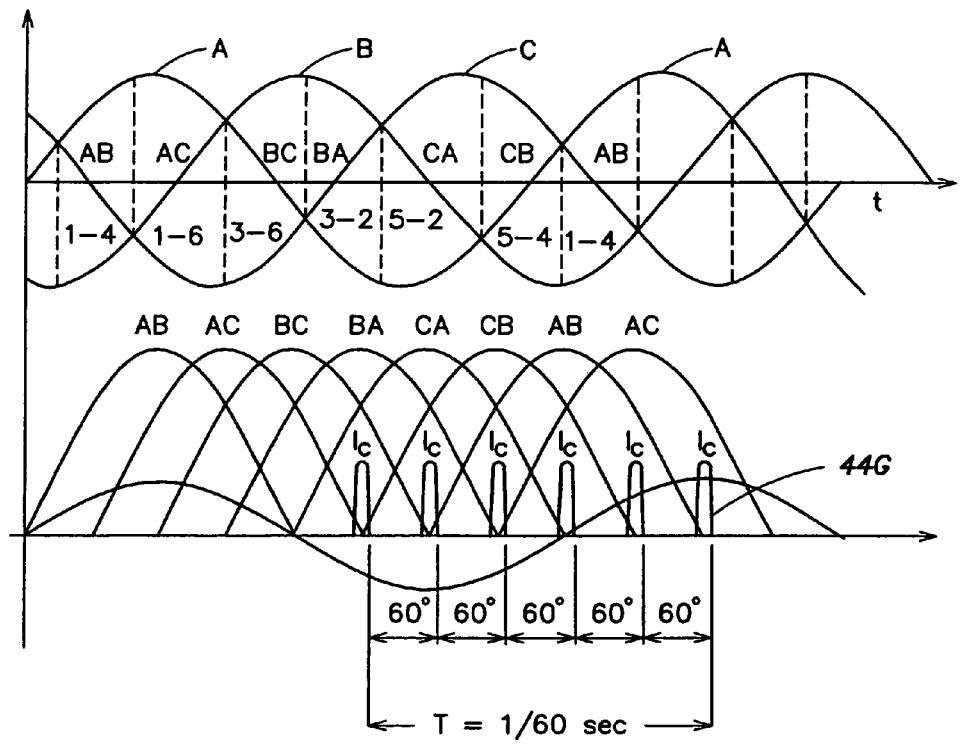
FIG. 6d is the associated timing diagram.
Figure 5E:
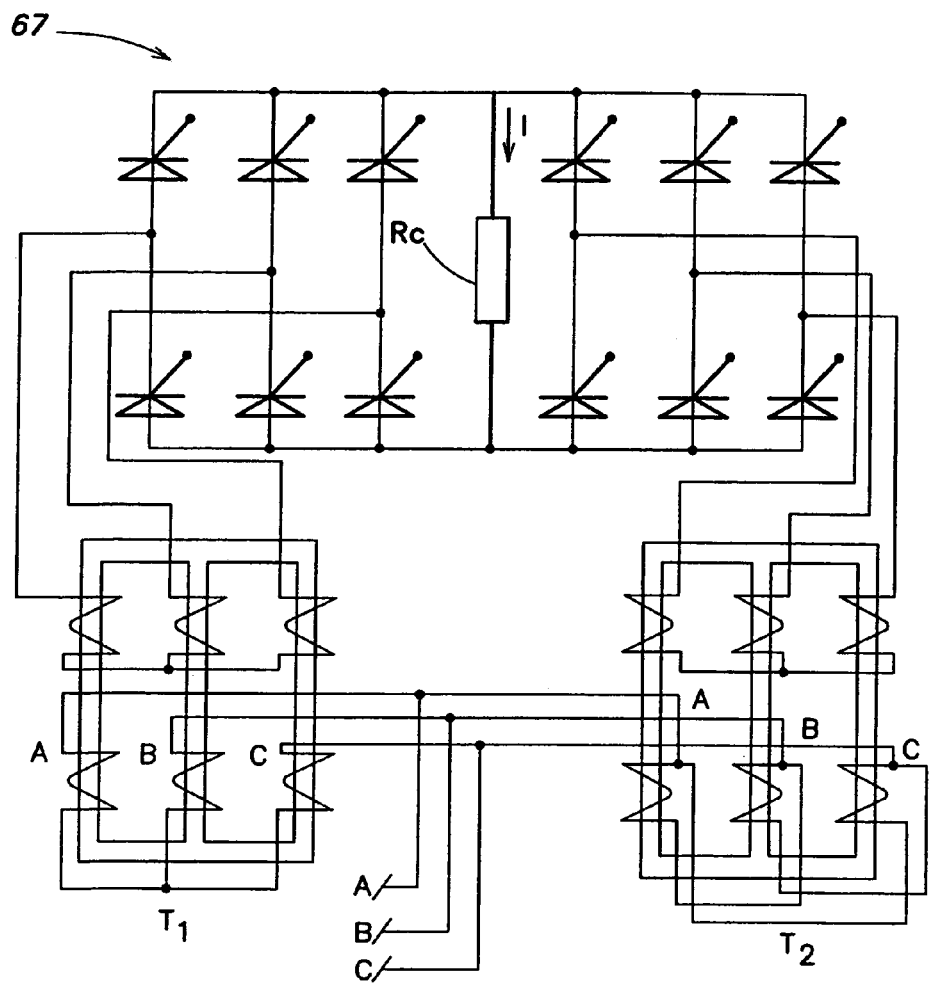
FIG. 5e is a circuit diagram showing one configuration of a three phase, twelve pulse unipolar pulsator for providing additional current pulses from the line frequency supply.
Figure 6E:
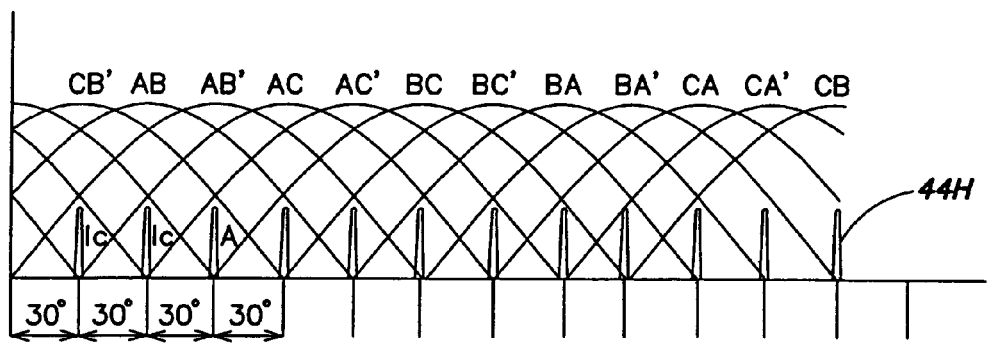
FIG. 6e is the associated timing diagram.

In FIGS. 5*a*–5*e;* $RC_{C20}$ is the equivalent total resistance of the heating coil circuit. In FIG. 5*e,* the transformers T1 and T2 provide two systems of three-phase voltages shifted 30 degrees—T1 is fed from 3 phases in a star-connection and T2 is fed from 3 phases in a delta-connection. In FIGS. 6a–6b, the curves $U_A$, $U_B$ and $U_C$ denote timing diagrams of voltages in phases A, B and C. In FIG. 6d, the curves A, B and C relate to the voltages in phases A, B and C; the curves AB, AC, BC, BA, CA, CB relate to corresponding line voltages AB, AC and so on; in the interval 1–4 the thyristors 1 and 4 switch on and provide the current pulse to the load $R_{c20}$ from the line voltage AB; in the interval 1–6 the thyristors 1 and 6 switch on and provide the current pulse to the load $R_{c20}$ from the line voltage AC, and so on. In FIG. 6e, the curves AB, AC, BC, BA, CA, CB correspond to the line voltages AB, AC and so on supplied from the transformer T1; the curves AB', AC', BC', BA', CA', CB' correspond to the line voltages AB, AC and so on supplied from the transformer T2.

Providing the additional pulses increases the fundamental frequency and thus multiplies the frequency provided by the high frequency harmonic component of the individual pulses. Providing higher frequency signals results in higher equivalent eddy current resistance, and thus higher power provided to the inductively heated core. Because of the close magnetic coupling between the coil and core, the border frequency is reduced. The eddy current resistance increases as the square root of the frequency (above the border frequency). As such, the higher fundamental frequency provided by these more complex arrangements, combined with the high frequency of the steeply varying current pulse itself, provide significantly enhanced inductive heating.

An experiment was performed which illustrates the improved performance of a combined inductive and resistive heating system powered by the current pulses described herein, compared to the same heating system powered by a 60 Hertz sinusoidal signal voltage. The heating apparatus is shown in FIG. 7, a comparison of the heating rates in FIG. 8, and the shape of the current pulses in FIG. 9.

Figure 7:
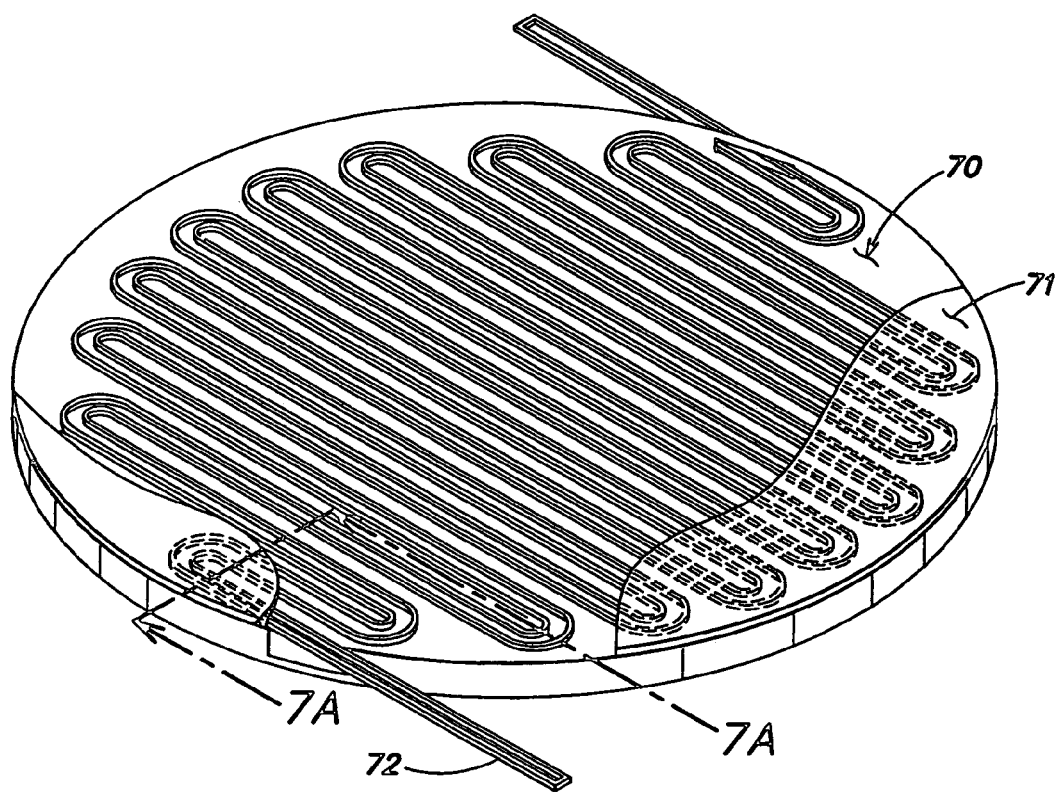
FIG. 7 shows an isometric view of a heating unit used in an experiment comparing the heating performance from a sinusoidal current compared to current pulses, including an enlarged cross-sectional portion taken along lines A—A.
Figure 7A:
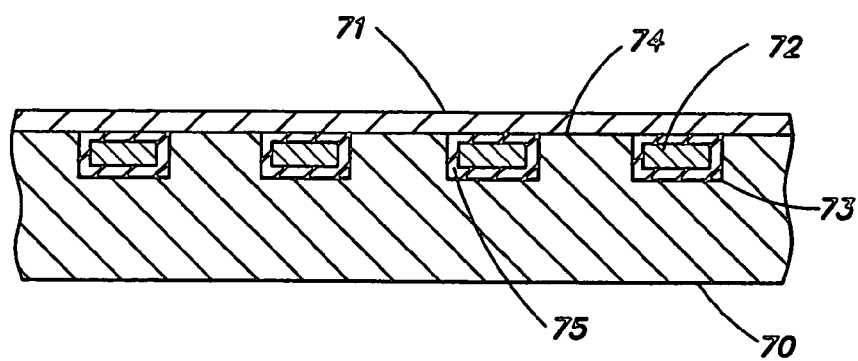

As shown in FIG. 7, the article to be heated was a flat steel disc 70 (5 mm thickness and 160 mm diameter) covered by a steel yoke 71 (1 mm thickness and 160 mm diameter). This article was first heated with a 60 Hz sinusoidal signal (industrial power supply). Then, after cooling to ambient temperature, the plate was heated with current pulses from an IGBT source, similar to that shown and described in FIG. 3c. A heating coil 72 was formed of nickel chromium rectangular wire, 2.92 meters long and having a crossection of 2.5 mm×1 mm, to provide a coil resistance of 1.17 ohm. The coil 72, covered in an insulating material 75, was embedded in a snake-shaped groove 73 in the top surface 74 of the disc, then covered by yoke 71 to provide a closed magnetic loop. The coil 72, disc/core 70 and yoke 71, were all in close physical contact (minimizing any air gaps). The disc 70 and yoke 71 were made of the same steel material. From the configuration of FIG. 7, with the electrically insulated coil 72 embedded between steel disc 70 and steel yoke 71, a border frequency was calculated from Equation 2 (which follows) of only 24 Hz. In contrast, a border frequency of about 2 Khz would be expected without the closed magnetic loop (without the yoke).

With a sinusoidal 60 Hz signal voltage across coil 72, a voltage was measured of 9 volts RMS to provide a current of 10 amps RMS. Thus, the electrical power delivered to the coil 72 was about 117 Watts. The rate of change of temperature of the disc 70 is plotted in FIG. 8. The rate of change was 0.27° C./sec. for the 60 Hz sinusoidal voltage input. The power delivered to the disc 70 was calculated to be 117 Watts.

From an analysis of electromagnetic processes under inductive heating, Kirchoff's equation for a heater coil circuit can be represented for frequencies higher than the border frequency, $\omega > \omega_b$ (where the border frequency $\omega_b = R_m R_c = 2\pi f_b$), by:

$$U_{ps} = I_c(R_c + K_c^2 N^2 R_e) + I_c j\omega(1 - K_c^2)L_c \qquad (2)$$

where:
 $\omega$ is the frequency of the power supply source above the border frequency;
 $U_{ps}$ is the RMS voltage of the power supply source;
 $I_c$ is the current in the heating coil (RMS);
 $R_e$ is the equivalent resistance to the flow of eddy currents;
 $R_m$ is the equivalent magnetic resistance of the magnetic flux circuit;
 N is the number of turns of wire in the coil;
 $R_c$ is the resistance of the heating coil;
 $L_c$ is the inductance of the heating coil;
 $K_c<1$ is the coefficient of electromagnetic connection between the heating coil and the eddy currents; and
 $j=sqrt(-1)$ is the imaginary unit.

For the 60 Hz sinusoidal supply signal, a total resistance of about 1.2 ohms was measured from the voltage and current at the coil. The eddy current equivalent resistance $R_e$ was calculated (from Equation 1b) to be 0.1 ohm. Adding in the resistance of the nickel chromium wire itself of 1.17 ohms, the total resistance expected to be measured at the coil was 1.27 ohms. The actual measured resistance of about 1.2 ohms was reasonably close to this expected value. It can be seen from these numbers that only about 8% of the power was delivered inductively using the 60 Hz sinusoidal supply signal. Most of the power delivered can thus be accounted for by resistive heating of the nickel chromium wire.

Figure 8:
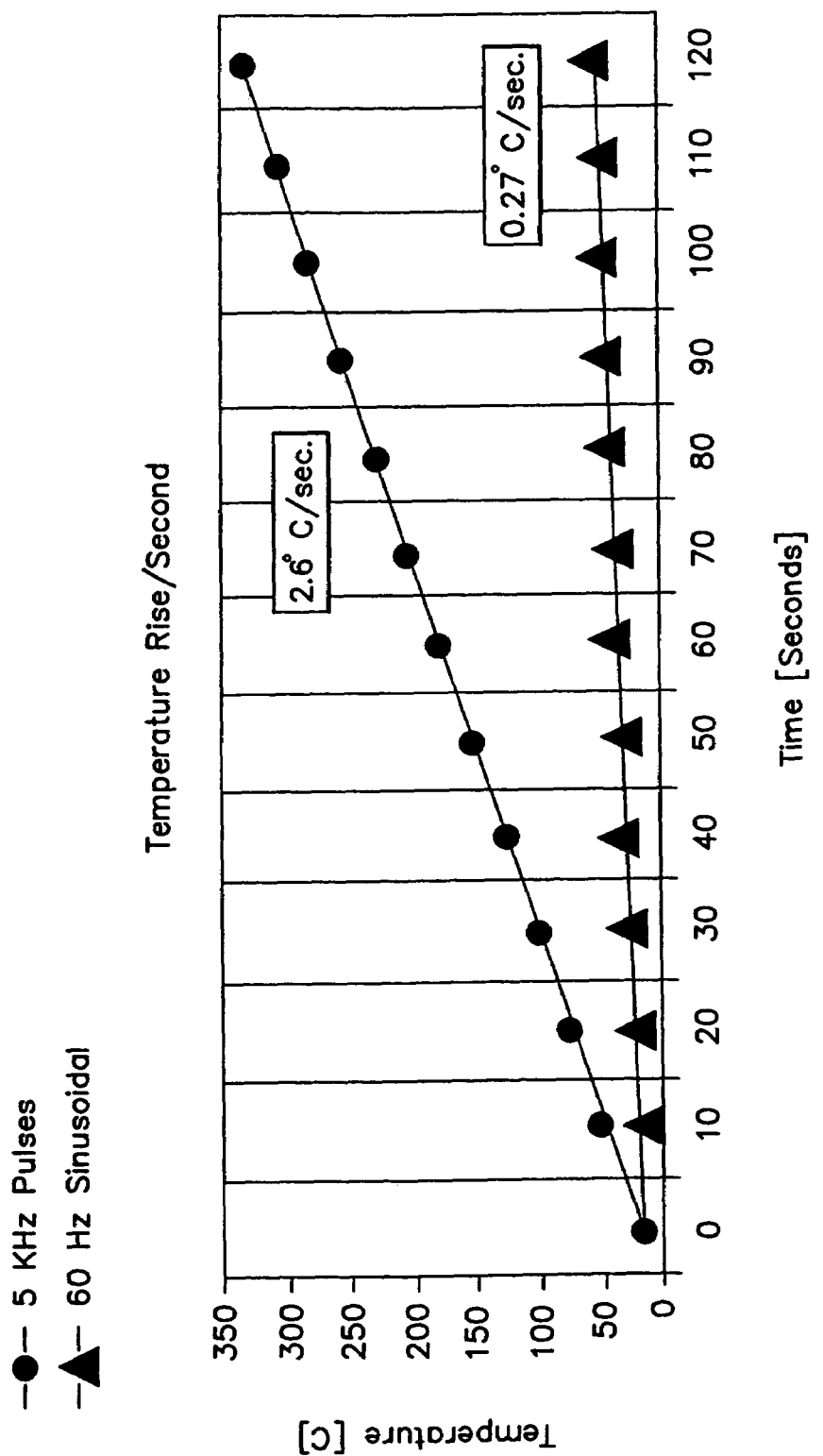
FIG. 8 is a graph of recorded data for the experiment using the apparatus of FIG. 7, which shows a substantially higher rate of heating with the current pulses as compared to a line frequency sinusoidal current.

In comparison, when the 60 Hz supply signal was replaced with current pulses from an IGBT similar to that shown in FIG. 3c (obtained from International Rectifier Corp., IRGP450U, rated at 500 volts and 60 amps and hard switching to 10 KHz), current pulses with a frequency of 5 KHz were provided. These pulses 80 from the IGBT had the profile shown in FIG. 9, with four high slope segments in each pulse. The voltage was adjusted to provide the same current of 10 amps (as with the 60 Hz supply); however, to provide that 10 amp current with the high frequency pulses provided by the IGBT, the voltage had to be increased to 114 volts. The higher voltage was the result of the higher equivalent eddy current resistance in the heated article, as transformed back to the coil. The electrical power in the coil was now approximately 1140 Watts. The rate of temperature increase in the steel disc was now measured at 2.6° C./sec, as shown in FIG. 8.

Figure 9:
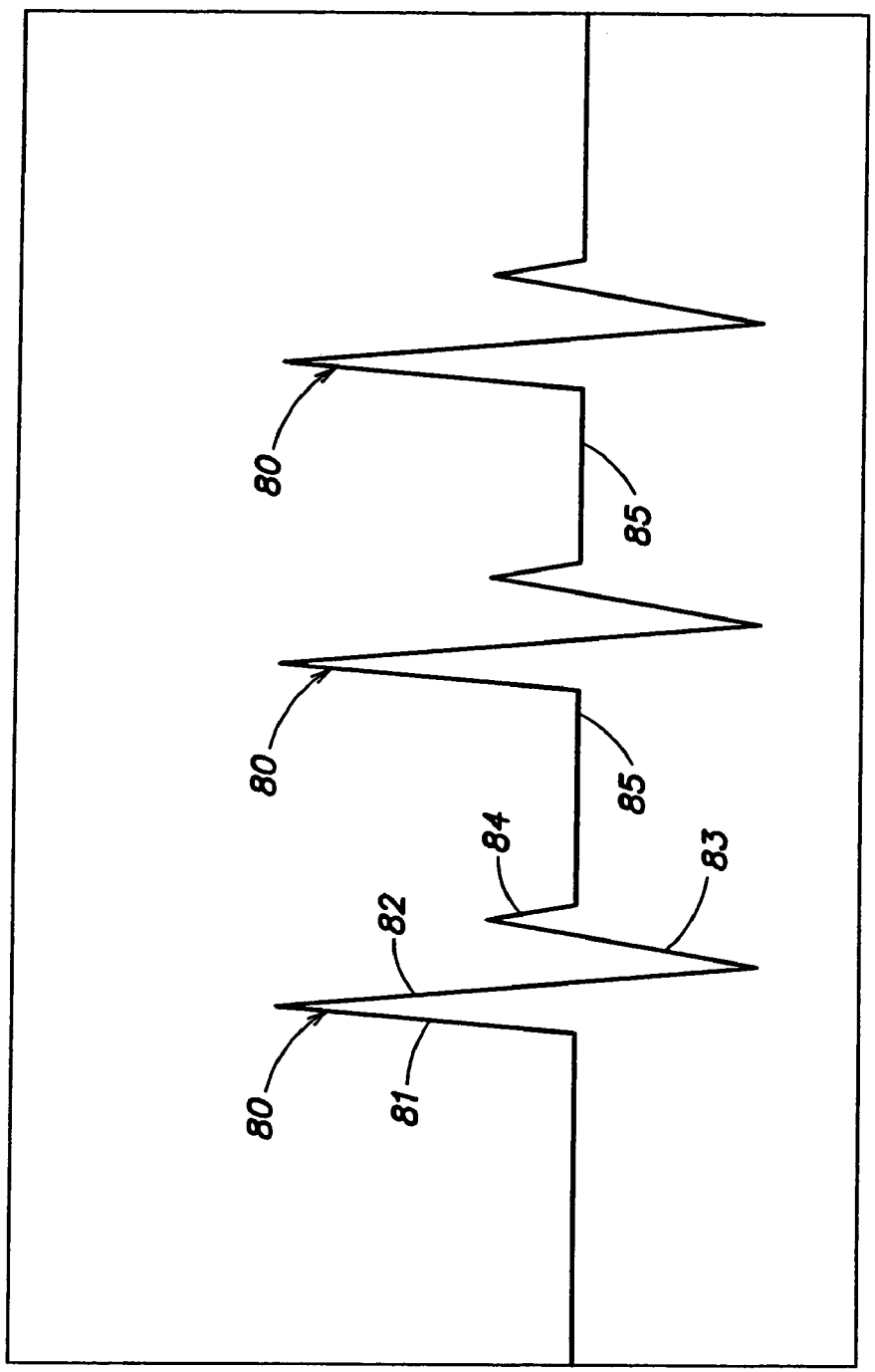
FIG. 9 is a schematic diagram of the current pulse profile supplied to the apparatus of FIG. 7, which produced the experimental data shown in FIG. 8.

The eddy current equivalent resistance for 5 KHz current pulses was calculated from Equation 1b, which shows that the equivalent eddy current resistance increases as the square root of the frequency. Thus, with the 5 KHz frequency, which is almost 100 times higher than the 60 Hz provided in the first experiment, the eddy current resistance is expected to be about 10 times higher, or about 1.8 ohms. In practice, the eddy current equivalent resistance at 5 KHz was actually measured to be about 10 ohms (dividing 114 volts by 10 amps and subtracting the 1.17 ohms resistance of the coil itself). The much larger equivalent eddy current resistance actually measured shows that the eddy current resistance increased much more than the 10 fold increase expected from the less than 100 fold increase in nominal frequency. The effective frequency increase must have actually been much higher than 5 KHz. To account for the almost 6 fold greater equivalent resistance, the effective frequency increase must have been about 180 KHz. This much higher frequency could have been obtained because of the high frequency harmonics in each of the pulses, as shown in FIG. 9. A Fourier transform of the pulses will show the high level of energy in these high frequency harmonics.

The Fourier transform for periodic functions (the current pulses are periodic functions) leads to Fourier series:

$$F(t)=A0+A1\ Sin(\omega t)+A2\ Sin(2\omega t)+A3\ Sin(3\omega t)+\ldots$$

where
$\omega=2\pi f=$fundamental angular frequency,
f=1/T=fundamental frequency,
t=time,
T=period of this periodic function,
A0=constant,
A1,A2,A3, . . . =amplitudes of first, second, third, . . . harmonics.

For example a unity square wave function $F_{sw}(\omega t)$, with fundamental frequency $\omega$, has the following Fourier series:

$$F_{sw}(\omega t)=4/\pi[Sin(\omega t)+\tfrac{1}{3}Sin(3\omega t)+\tfrac{1}{5}Sin(5\omega t)+\tfrac{1}{7}Sin(7\omega t)+\ldots]$$

In the present case, the 6-fold increase means 5/6=83% of the pulse energy was in high frequency harmonics. Thus, the much higher than expected eddy current resistance can be explained by the presence of these high frequency harmonics in each pulse. As a result, with a higher frequency signal, a far greater proportion of the power is provided to the heated article (here a metal disc) from the inductive heating, than from resistive heating.

In various implementations, providing 15 to 85% of the pulse energy in high frequency harmonics would be desirable. In particular implementations, the higher end of this range may be desirable, i.e., 70–85% (e.g., for rapid melting of a frozen plug in a nozzle or gate orifice to allow flow of a material or uniform heating of an extruder barrel). In such implementations, a lower range of 25–50% is less desirable, and with a middle range of 50–70% as the second preference. The operating range may vary from initial heat up to a steady state operating range.

As a basis of comparison, a rectangular shaped wave (instead of sinusoidal and with the same amplitude) has about 25% of its energy in high harmonics, while a triangular shaped wave (with the same amplitude) has about 10%.

The heating power which is consumed from a power supply may contain two portions:
a) power of the resistive heating $$P_R=I_C^2R_c$$

b) power of the inductive heating $$P_I=I_c^2K_C^2N^2R_e$$

where $I_C$ is the current in the heater coil (RMS) and $R_c$ is the resistance of the heater coil; $R_e$ is the equivalent resistance to the flow of eddy currents; N is the number of coil turns; and $K_C$ is a coefficient of electromagnetic connection between the circuits of the heating coil and the eddy currents. In the combined resistive/inductive implementations described herein, the resistive component $P_R$ actually contributes to the overall heating efficiency, as compared to the prior art systems which cool the heater coil and thus lose this component. Here the coil can be produced from a high resistivity and high working temperature material, e.g., NiCr (Nichrome). The heating coil is embedded in the heated article, which increases the coefficient of electromagnetic connection almost to $K_c=1$ and therefore increases the induction portion of the heating power $P_I$ under the same coil current. With $I_c$ (maximum allowed current for a given coil), N and $K_c$ fixed, the inductive component of the heating power $P_I$ is increased by increasing the equivalent resistance of the eddy currents circuit $R_e$ (as previously described with respect to Equation 1).

An analysis of electromagnetic processes of inductive heating under an arbitrary input current, which is not necessarily a sinusoidal variation, shows that the resistance to eddy current flow $R_e$ is a function of the rate of change of current in the coil. The experimental data suggests that:

$$R_e \sim (dI_c/dt)^n, \text{ where } n>1 \qquad (3)$$

where $I_c$ is the current in the coil, and t is time. In view of this relationship, the proportion of heating from inductive heating can be significantly increased, without increasing the current in the coil, by replacing a high frequency sinusoidal current supply with current pulses having steeply varying portions. The pulses can be provided at a lower frequency than the sinusoidal current they are replacing, where the steeply varying portions provide high frequency harmonics that more than make up for the lower frequency fundamental.

Thus, with better coupling provided by embedding coil 20 in the core, and by providing a yoke to ensure a closed loop for magnetic flux, the border frequency is significantly decreased. This allows a substantial improvement in inductive heating performance by providing current pulses having high slope regions where a significant amount of their energy is provided in high frequency harmonics. This also substantially boosts the frequency of the signal in coil 20 over that provided by merely pulse generating a direct current or 60 Hz AC signal and providing those signals to a resonance converter power supply.

It has thus been shown that a lower cost power supply can be provided for induction heating, which includes a pulse generator that can be excited with a low or line frequency. Signal generating devices, including thyristors, GTOs, and IGBT devices can be used to provide short current pulses from the line frequency or direct current. The high frequency harmonics in these current pulses are preserved (in the absence of a resonance circuit) to significantly increase the power transfer to the inductively heated object. Also, cooling of the heater coil is not required, as in prior systems.

Other implementations of the invention will be apparent to those skilled in the art from consideration of the specification and practice of the invention disclosed herein. It is intended that the specification and examples be considered as exemplary only, with a true scope of the invention being indicated by the following claims. Examples of alternatives are described below.

The heater coil may be any type of conductive material or element that produces a magnetic field when placed in close proximity to a magnetic material.

Thus, by heater coil it is meant broadly any object or material which is electrically conductive (with varying levels of resistivity) for purposes of generating an alternating magnetic field when supplied with an alternating current. It is not limited to any particular form (wire, strand, coil, thick or thin film, pen or screen printing, thermal spray, chemical or physical vapor deposition, wafer or otherwise), nor to any particular shape or dimension (helical, planar, flat or otherwise). Typical examples include: helix or spiral, conical, two or three dimensional, water jet or stamp cut, wire EDM'd or milled, or a flat coil which is then formed into a cylindrical shape, etc.

A heater coil may be embedded wholly or partially in a core 22, alternatively in a yoke 28, or partially in both core 22 and yoke 28. The coil may be embedded in a reversing pattern, where the coil first heads in one direction then turns 180° and heads in the reverse direction, reverses again and repeats this pattern around or along the axis of a cylindrical object, or the surface of a planar (flat like) object. The coil may also be embedded in a spiral fashion on the surface of a generally flat like object.

A nickel chromium heater coil is described in one or more implementations herein, as being a substantially more resistive material than copper. Other suitable heater coil materials can be used also, referred to herein as resistive conductors, including for example alloys of nickel, chromium, aluminum, iron, copper, etc.

By article it is meant broadly any object or material (gas, liquid, solid or combination thereof) which can be inductively heated by the application of a magnetic flux to induce eddy currents therein and the resulting inductive heating thereof. Thus, article is used broadly and includes any type of load. A core is one type of article or load, commonly used in the field of inductive heating; again core is used broadly herein. There is no restriction on the geometry, dimensions and/or physical location of the article with respect to the heater coil, e.g., it can be radially inwardly or radially outwardly of the coil, and need not be cylindrical or tubular. Typical examples include: chemical reactor vessels, extrusion barrels, molds or dies, melt conveying systems, carburetor pre-heaters, silicon crystal growing systems, etc.

The article which undergoes inductive heating is not limited to a single article, e.g., a magnetic core as described herein, but may include multiple articles. For example, in addition to (or instead of) a core as the heated article, the ultimate material to be heated, such as that passing through the passageway 26 of core 22, may be an electrically conductive material (such as aluminum or magnesium) which can be heated by induction from core 22 and by induction from coil 20.

An IGBT device capable of higher voltage and current than used in the described experiment can be run at a frequency higher than 5 KHz, thus providing much more power to the load for heating with the same coil and with the same current in the coil as provided in the 60 Hz experiment.

The RMS current in the coil and power provided by the coil can be controlled by varying the period (the fundamental frequency) of the pulses at constant pulse width, or by varying the width of the pulses at the constant fundamental frequency of the pulses provided to the coil, or by both.

By fundamental frequency it is meant the frequency of the pulse repetition.

By effective frequency it is meant the frequency of the pure sinusoidal signal which provides the same inductive heating effect as the pulse signal.

By high frequency harmonics it is meant the pure sinusoidal signals with frequencies at a multiple to the fundamental frequency.

A slotted yoke is described as one implementation of an article which closes the loop of magnetic flux (with the core), but is less efficient in terms of inductive heating because the slots (essentially air gaps) create discontinuities or restrictions in the magnetic field. Many other structures can be used to create such discontinuities or restrictions, for example, portions of the yoke can be made of materials (other than air) which are not magnetically permeable or substantially less permeable, than the favored ferromagnetic core, or the yoke can be made from ferrite, fluxtron or similar materials with high resistivity to the flow of eddy currents. Also, yoke is used broadly and is not limited to a specific structure, shape or material.

Figure 10:
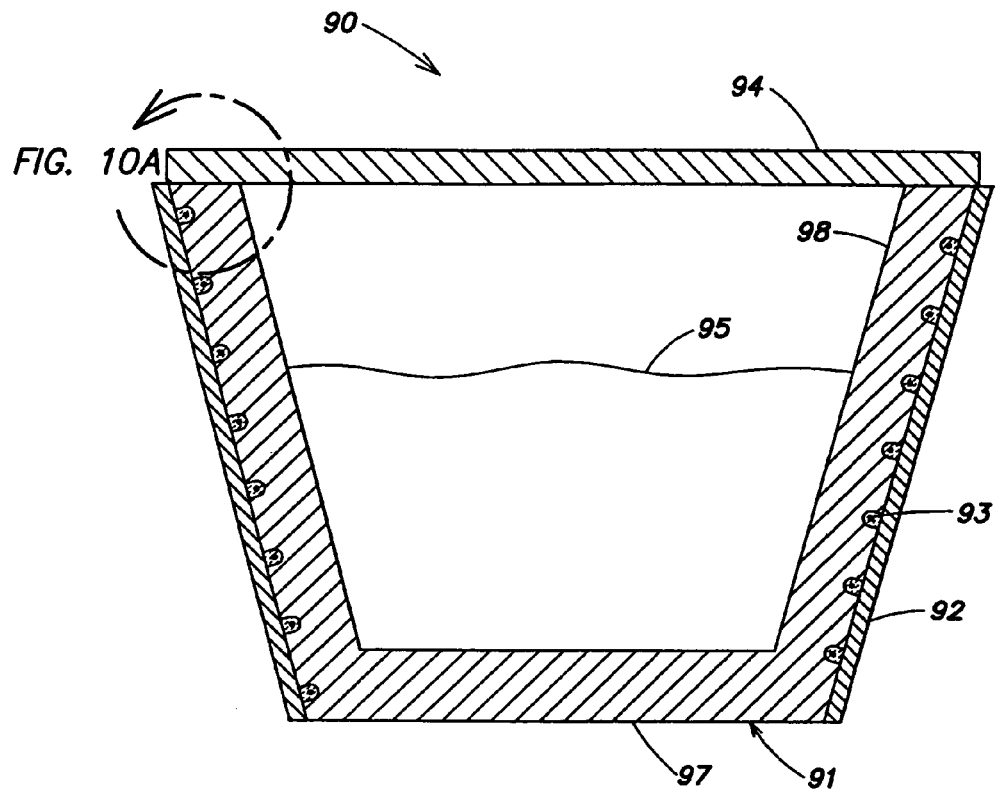
FIG. 10 is a cross-sectional schematic diagram of an alternative implementation, a furnace, including an enlarged fragmentary view of the encircled section A.
Figure 10A:
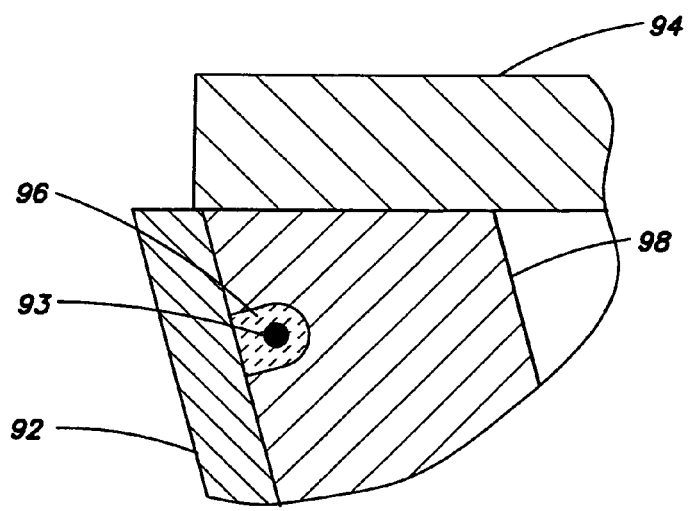

FIG. 10 illustrates a furnace 90 as an alternative heating system. The furnace includes a bowl-shaped container 91 forming a core, having a bottom wall 97 and an upwardly flared side wall 98, with a coil 93 embedded in a cubical groove around the outer circumference of the side wall. A sleeve-like yoke 92 covers the core side wall 98, in direct contact, closing the magnetic loop. A fixed or removable lid 94 covers the top opening of container 91. A product 95, which is molten or otherwise desired to be maintained above a select temperature, is contained within the core 91. A detail section in FIG. 10A shows the coil 93, surrounded by an insulating layer 96, in close contact with the core side wall 98 and yoke 92.

Figure 11:
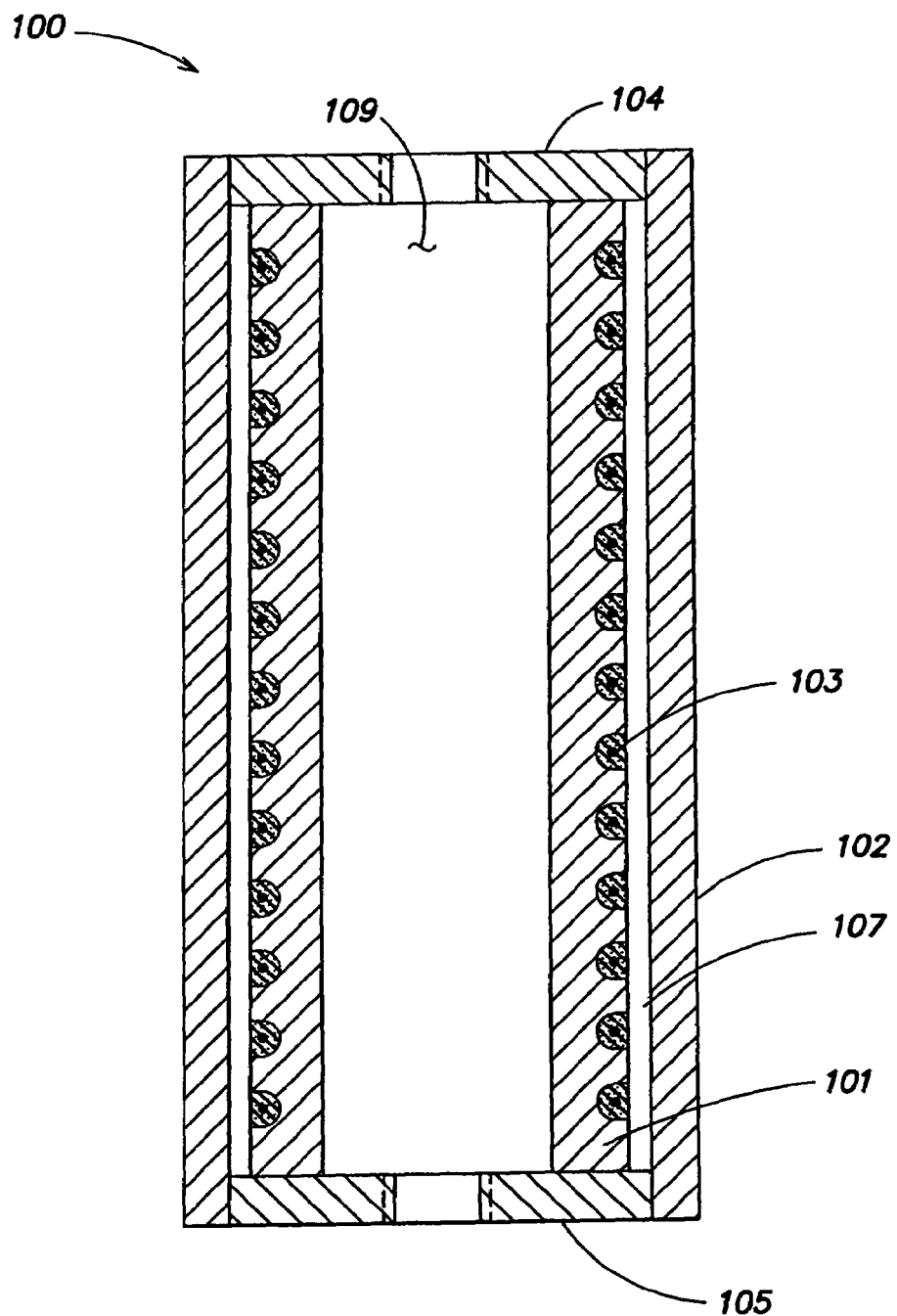
FIG. 11 is a cross-sectional schematic diagram of an alternative implementation, a water heater or chemical reactor.

FIG. 11 shows a further alternative water heater or chemical reactor 100 implementation in which a cylindrical core 101 has an embedded coil 103 in its outer surface, and a cylindrical yoke 102 surrounds the core but is separated therefrom by an air gap 107. A disc-shaped lower yoke 105 in direct contact with yoke 102 closes the bottom end of the heater/reactor, and a disc-shaped upper yoke 104 in direct contact with yoke 102 closes the top end of the heater/reactor, thus closing the magnetic loop. The close physical (direct) contact between the core 101 with the upper and lower yokes 104 105, and the side wall yoke 102, enhances the coupling of the closed magnetic loop. A flowable material to be heated may be sent through the central passageway 109 in the heater/reactor.

Figure 12:
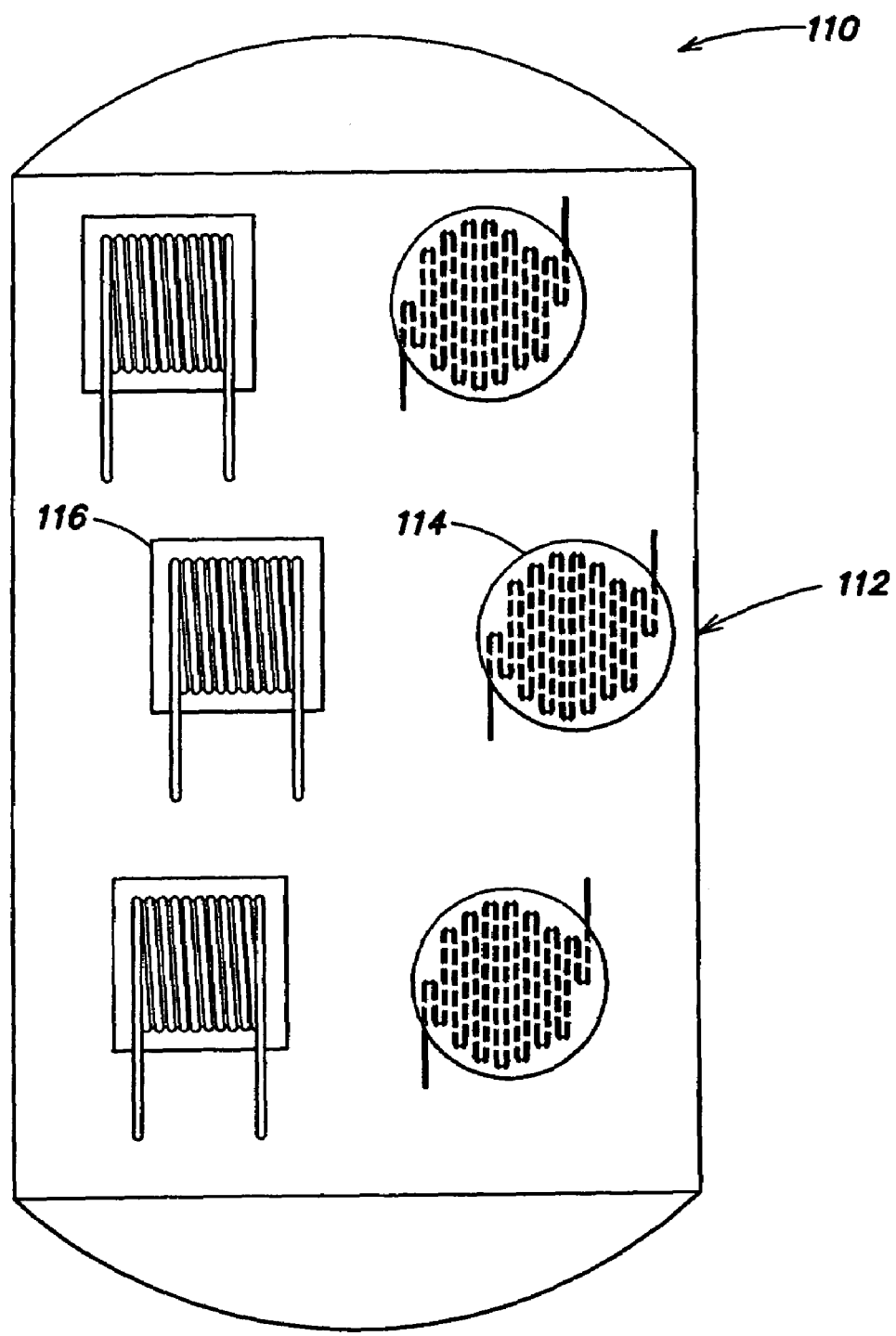
FIG. 12 is a schematic diagram of an alternative implementation, a chemical container or reactor with heater patches mounted thereon.

FIG. 12 shows a further alternative heating system 110 in which a chemical container or reactor 112 has heater patches mounted thereon. Two alternative types of heater patches are shown, circular discs 114 on the right, and square or rectangular plates 116 on the left. The construction of these heater patches may be similar to the structure of FIG. 7.

These and other modifications would be readily apparent to the skilled person as included within the scope of the described invention.

The invention claimed is:

1. A heating apparatus comprising:
   a heater coil for inductive heating; and
   a power source for supplying to the heater coil non-sinusoidal current pulses having steeply varying portions providing high frequency harmonics in the heater coil, wherein the heater coil generates a magnetic flux for inductive heating of an article.

2. The apparatus of claim 1, wherein the heater coil is inductively coupled to a load which includes the article.

3. The apparatus of claim 2, wherein the load includes a closed loop for the magnetic flux.

4. The apparatus of claim 3, wherein the load includes a core and a yoke which form the closed loop.

5. The apparatus of claim 2, wherein the load includes a core and a yoke and the heater coil is disposed between or embedded within at least one of the core and yoke.

6. The apparatus of claim 2, wherein the load includes a core having a passageway for a flowable material.

7. The apparatus of claim 6, wherein the core heats the flowable material.

8. The apparatus of claim 6, wherein the heater coil is positioned in the core so that heating is concentrated in the passageway.

9. The article of claim 2, wherein a portion of the load has discontinuities or restrictions to a flow of eddy currents for concentrating inductive heating in another portion of the load.

10. The article of claim 1, wherein the article forms at least part of a closed loop for the magnetic flux.

11. The apparatus of claim 1, wherein the power source includes a low or line frequency current source.

12. The apparatus of claim 1, wherein the power source is variable for adjusting the energy content of the current pulses supplied to the heater coil.

13. The apparatus of claim 1, wherein the heater coil is inductively coupled to a load which includes a core, and the heater coil is at least partially embedded in the core.

14. The apparatus of claim 1, wherein the heater coil is wrapped around the article.

15. The article of claim 1, wherein the heater coil is mounted on the surface of the article.

16. A method of supplying current to a heater coil of a heating apparatus for inductive heating, the method comprising: supplying to the heater coil non-sinusoidal current pulses having steeply varying portions providing high frequency harmonics in the heater coil, wherein the heater coil generates a magnetic flux for inductive heating of an article.

* * * * *